(12) United States Patent
Dang et al.

(10) Patent No.: US 11,036,751 B2
(45) Date of Patent: Jun. 15, 2021

(54) ADVANCED INSIGHTS EXPLORER

(71) Applicant: ServiceNow, Inc., Santa Clara, CA (US)

(72) Inventors: Kanwaldeep Kaur Dang, Sammamish, WA (US); Austin James Steeno, Renton, WA (US); Ritika Goyal, Seattle, WA (US); Purushottam Shridhar Amradkar, Sammamish, WA (US)

(73) Assignee: ServiceNow, Inc., Santa Clara, CA (US)

( * ) Notice: Subject to any disclaimer, the term of this patent is extended or adjusted under 35 U.S.C. 154(b) by 209 days.

(21) Appl. No.: 15/973,135

(22) Filed: May 7, 2018

(65) Prior Publication Data
US 2019/0340290 A1    Nov. 7, 2019

(51) Int. Cl.
*G06F 16/30* (2019.01)
*G06F 16/248* (2019.01)
(Continued)

(52) U.S. Cl.
CPC ........... *G06F 16/248* (2019.01); *G06F 9/453* (2018.02); *G06F 16/2282* (2019.01);
(Continued)

(58) Field of Classification Search
None
See application file for complete search history.

(56) References Cited

U.S. PATENT DOCUMENTS 6,321,229 B1   11/2001   Goldman
6,609,122 B1    8/2003   Ensor
(Continued)

FOREIGN PATENT DOCUMENTS

WO    2018069811 A1    4/2018

OTHER PUBLICATIONS

Guilherme De Cunha Rodregues et al.; "Monitoring of cloud computing environments", Proceedings of the 31st Annual ACM Symposium on Applied Computing, SAC '16; Apr. 4, 2016, pp. 378-383, XP058256653.

(Continued)

*Primary Examiner* — Polina G Peach
(74) *Attorney, Agent, or Firm* — Fletcher Yoder PC

(57) ABSTRACT

A platform includes a time series database. The platform also includes one or more instance data tables. A function library of the platform includes a set of function definitions and a scripting engine of the platform executes scripts. An advanced insight endpoint of the platform is communicatively coupled to and accessible by an advanced insights explorer user interface. The advanced insight endpoint receives one or more expressions from an expression component of the advanced insights explorer user interface, parses the one or more expressions and validates the one or more expressions against the set of function definitions. The endpoint generates and provides one or more scripts corresponding to the one or more expressions and receives results of execution the one or more scripts. Results are provided to a visualization component of the advanced insight user interface, to cause rendering of the results within the advanced insights explorer user interface.

20 Claims, 31 Drawing Sheets

(51) Int. Cl.
*G06F 9/451* (2018.01)
*G06F 16/22* (2019.01)
*G06F 16/2458* (2019.01)
*G06F 16/9535* (2019.01)
*G06F 16/23* (2019.01)
*G06F 16/00* (2019.01)
*G06F 40/205* (2020.01)

(52) U.S. Cl.
CPC ...... *G06F 16/2365* (2019.01); *G06F 16/2477* (2019.01); *G06F 16/9535* (2019.01); *G06F 40/205* (2020.01)

(56) References Cited

U.S. PATENT DOCUMENTS

| | | |
|---|---|---|
| 6,799,189 B2 | 9/2004 | Huxoll |
| 6,895,586 B1 | 5/2005 | Brasher |
| 7,020,706 B2 | 3/2006 | Cates |
| 7,027,411 B1 | 4/2006 | Pulsipher |
| 7,028,301 B2 | 4/2006 | Ding |
| 7,062,683 B2 | 6/2006 | Warpenburg |
| 7,131,037 B1 | 10/2006 | LeFaive |
| 7,170,864 B2 | 1/2007 | Matharu |
| 7,392,300 B2 | 6/2008 | Anantharangachar |
| 7,617,073 B2 | 11/2009 | Trinon |
| 7,685,167 B2 | 3/2010 | Mueller |
| 7,689,628 B2 | 3/2010 | Garg |
| 7,716,353 B2 | 5/2010 | Golovinsky |
| 7,769,718 B2 | 8/2010 | Murley |
| 7,783,744 B2 | 8/2010 | Garg |
| 7,890,802 B2 | 2/2011 | Gerber |
| 7,925,981 B2 | 4/2011 | Pourheidari |
| 7,930,396 B2 | 4/2011 | Trinon |
| 7,933,927 B2 | 4/2011 | Dee |
| 7,945,860 B2 | 5/2011 | Vambenepe |
| 7,966,398 B2 | 6/2011 | Wiles |
| 8,051,164 B2 | 11/2011 | Peuter |
| 8,082,222 B2 | 12/2011 | Rangarajan |
| 8,141,059 B2 * | 3/2012 | Ding .................. G06F 8/71 717/133 |
| 8,224,683 B2 | 7/2012 | Manos |
| 8,266,096 B2 | 9/2012 | Navarrette |
| 8,380,645 B2 | 2/2013 | Kowalski |
| 8,402,127 B2 | 3/2013 | Solin |
| 8,457,928 B2 | 6/2013 | Dang |
| 8,478,569 B2 | 7/2013 | Scarpelli |
| 8,554,750 B2 | 10/2013 | Rangaranjan |
| 8,646,093 B2 | 2/2014 | Myers |
| 8,674,992 B2 | 3/2014 | Poston |
| 8,689,241 B2 | 4/2014 | Naik |
| 8,743,121 B2 | 6/2014 | De Peuter |
| 8,745,040 B2 | 6/2014 | Kowalski |
| 8,812,539 B2 | 8/2014 | Milousheff |
| 8,818,994 B2 | 8/2014 | Kowalski |
| 8,832,652 B2 | 9/2014 | Mueller |
| 8,887,133 B2 | 11/2014 | Behnia |
| 9,015,188 B2 | 4/2015 | Behne |
| 9,037,536 B2 | 5/2015 | Vos |
| 9,043,696 B1 * | 5/2015 | Meiklejohn .......... G06F 16/986 715/234 |
| 9,098,322 B2 | 8/2015 | Apte |
| 9,137,115 B2 | 9/2015 | Mayfield |
| 9,239,857 B2 | 1/2016 | Trinon |
| 9,317,327 B2 | 4/2016 | Apte |
| 9,323,801 B2 | 4/2016 | Morozov |
| 9,353,252 B2 | 6/2016 | Mueller |
| 9,412,084 B2 | 9/2016 | Kowalski |
| 9,467,344 B2 | 10/2016 | Gere |
| 9,535,737 B2 | 1/2017 | Joy |
| 9,557,969 B2 | 1/2017 | Sharma |
| 9,612,408 B2 | 4/2017 | Wei et al. |
| 9,613,070 B2 | 4/2017 | Kumar |
| 9,645,833 B2 | 5/2017 | Mueller |
| 9,654,473 B2 | 5/2017 | Miller |
| 9,659,051 B2 | 5/2017 | Hutchins |
| 9,805,322 B2 | 9/2017 | Kelkar |
| 9,792,387 B2 | 10/2017 | George |
| 9,852,165 B2 | 12/2017 | Moroziov |
| 9,886,467 B2 * | 2/2018 | Kara ................. G06F 16/24575 |
| 10,002,203 B2 | 6/2018 | George |
| 2005/0060693 A1 * | 3/2005 | Robison ............. G06F 9/45512 717/143 |
| 2007/0162899 A1 * | 7/2007 | Schmidt ................. G06F 9/44 717/136 |
| 2009/0287685 A1 * | 11/2009 | Charnock ............... G06F 16/38 |
| 2013/0326620 A1 * | 12/2013 | Merza ................. H04L 63/1408 726/22 |
| 2014/0019936 A1 * | 1/2014 | Cohanoff ................. G06F 8/30 717/115 |
| 2014/0082591 A1 * | 3/2014 | Shukla ................ G06F 11/3668 717/124 |
| 2014/0267295 A1 * | 9/2014 | Sharma .................. G06F 16/41 345/440 |
| 2014/0279824 A1 * | 9/2014 | Tamayo ............. G06F 16/2428 707/600 |
| 2015/0170077 A1 * | 6/2015 | Kara ...................... G06F 16/26 705/7.38 |
| 2015/0263913 A1 | 9/2015 | De Temmerman et al. |
| 2016/0019316 A1 * | 1/2016 | Murphey .............. G06F 16/906 707/722 |
| 2016/0034525 A1 * | 2/2016 | Neels .................... G06F 16/285 707/737 |
| 2018/0032905 A1 * | 2/2018 | Abercrombie ......... G06N 20/00 |
| 2018/0191867 A1 * | 7/2018 | Siebel .................... G06Q 10/06 |
| 2018/0218037 A1 * | 8/2018 | Marquardt .......... G06F 16/2477 |
| 2018/0246918 A1 * | 8/2018 | Marquardt ............ G06F 16/284 |
| 2018/0330107 A1 * | 11/2018 | Gordon ................. G06F 21/604 |

OTHER PUBLICATIONS

Extended European Search Report for European Application No. 19170495 dated Sep. 17, 2019; 7 pgs.

* cited by examiner

ADVANCED INSIGHTS EXPLORER

BACKGROUND

The present disclosure relates generally to metric exploration on computer networks. More particularly, the present disclosure relates to an architecture for facilitating free-form exploration of metric data via exposed functions to backend data.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Organizations, regardless of size, rely upon access to information technology (IT) and data and services for their continued operation and success. A respective organization's IT infrastructure may have associated hardware resources (e.g. computing devices, load balancers, firewalls, switches, etc.) and software resources (e.g. productivity software, database applications, custom applications, and so forth). Over time, more and more organizations have turned to cloud computing approaches to supplement or enhance their IT infrastructure solutions.

Cloud computing relates to the sharing of computing resources that are generally accessed via the Internet. In particular, a cloud computing infrastructure allows users, such as individuals and/or enterprises, to access a shared pool of computing resources, such as servers, storage devices, networks, applications, and/or other computing based services. By doing so, users are able to access computing resources on demand that are located at remote locations, which resources may be used to perform a variety computing functions (e.g., storing and/or processing large quantities of computing data). For enterprise and other organization users, cloud computing provides flexibility in accessing cloud computing resources without accruing large up-front costs, such as purchasing expensive network equipment or investing large amounts of time in establishing a private network infrastructure. Instead, by utilizing cloud computing resources, users are able to redirect their resources to focus on their enterprise's core functions.

In modern communication networks, examples of cloud computing services a user may utilize include so-called infrastructure as a service (IaaS), software as a service (SaaS), and platform as a service (PaaS) technologies. IaaS is a model in which providers abstract away the complexity of hardware infrastructure and provide rapid, simplified provisioning of virtual servers and storage, giving enterprises access to computing capacity on demand. In such an approach, however, a user may be left to install and maintain platform components and applications. SaaS is a delivery model that provides software as a service rather than an end product. Instead of utilizing a local network or individual software installations, software is typically licensed on a subscription basis, hosted on a remote machine, and accessed by client customers as needed. For example, users are generally able to access a variety of enterprise and/or information technology (IT)-related software via a web browser. PaaS acts as an extension of SaaS that goes beyond providing software services by offering customizability and expandability features to meet a user's needs. For example, PaaS can provide a cloud-based developmental platform for users to develop, modify, and/or customize applications and/or automate enterprise operations without maintaining network infrastructure and/or allocating computing resources normally associated with these functions.

Data regarding items on a communications network may be monitored and presented, to assess network health. In some cases time series data may be retained, analyzed, and visualized. Unfortunately, however, due the vast number of devices on a network and the vast amount of data available for these devices, it is oftentimes difficult to drill down into the data to understand what is going on in the network.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Information Technology (IT) networks may include a number of computing devices, server systems, databases, and the like that generate, collect, and store information. As increasing amounts of data representing vast resources become available, it becomes increasingly difficult to analyze the data, interact with the data, and/or provide reports for the data. The current embodiments enable customized widgets to be generated for such data, enabling a visualization of certain indicators for the data for rapid and/or real-time monitoring of the data.

In some embodiments of the current disclosure, an Advanced Insights Explorer tool may enable users to explore metric data in a more free form way, by providing an easy to understand graphical user interface that generates complex metric queries utilizing predefined functions. For added functionality, the Advanced Insights Explorer tool may enable custom function creation, resulting in increased access to data in a more flexible manner.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to an electronic computing device such as, but not limited to, a single computer, virtual machine, virtual container, host, server, laptop, and/or mobile device, or to a plurality of electronic computing devices working together to perform the function described as being performed on or by the computing system. As used herein, the term "medium" refers to one or more non-transitory, computer-readable physical media that together store the contents described as being stored thereon. Embodiments may include non-volatile secondary storage, read-only memory (ROM), and/or random-access memory (RAM). As used herein, the term "application" refers to one or more computing modules, programs, processes, workloads, threads and/or a set of computing instructions executed by a computing system. Example embodiments of an application include software modules, software objects, software instances and/or other types of executable code. As used herein, the term "configuration item" or "CI" refers to a record for any component (e.g., computer, device, piece of software, database table, script, webpage, piece of metadata, and so forth) in an enterprise network, for which relevant data, such as manufacturer, vendor, location, or similar data, is stored in a CMDB.

Current embodiments relate to the Advanced Insights Explorer tool, which may enable users to explore metric data in a more free form way, by providing an easy to understand graphical user interface that generates complex metric queries utilizing predefined functions. For added functionality, the Advanced Insights Explorer tool may enable custom function creation, resulting in increased access to data in a more flexible manner.

Figure 1:
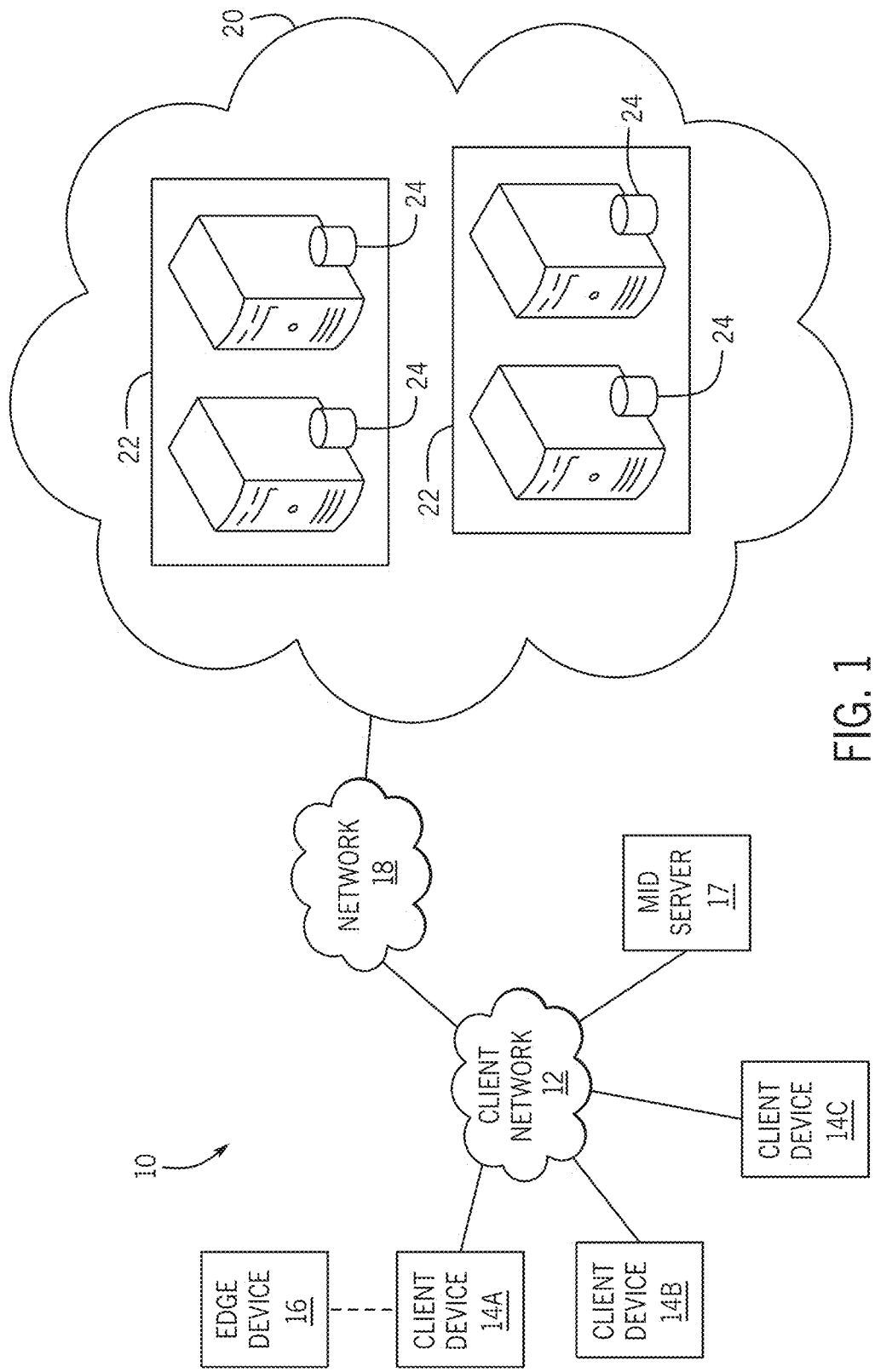
FIG. 1 is a block diagram of an embodiment of a multi-instance cloud architecture in which embodiments of the present disclosure may operate.

With the preceding in mind, the following figures relate to various types of generalized system architectures or configurations that may be employed to provide services to an organization in a multi-instance framework and on which the present approaches may be employed. Correspondingly, these system and platform examples may also relate to systems and platforms on which the techniques discussed herein may be implemented or otherwise utilized. Turning now to FIG. 1, a schematic diagram of an embodiment of a computing system 10, such as a cloud computing system, where embodiments of the present disclosure may operate, is illustrated. Computing system 10 may include a client network 12, network 18 (e.g., the Internet), and a cloud-based platform 20. In some implementations, the cloud-based platform may be a configuration management database (CMDB) platform. In one embodiment, the client network 12 may be a local private network, such as local area network (LAN) having a variety of network devices that include, but are not limited to, switches, servers, and routers. In another embodiment, the client network 12 represents an enterprise network that could include one or more LANs, virtual networks, data centers 22, and/or other remote networks. As shown in FIG. 1, the client network 12 is able to connect to one or more client devices 14A, 14B, and 14C so that the client devices are able to communicate with each other and/or with the network hosting the platform 20. The client devices 14A-C may be computing systems and/or other types of computing devices generally referred to as Internet of Things (IoT) devices that access cloud computing services, for example, via a web browser application or via an edge device 16 that may act as a gateway between the client devices and the platform 20. FIG. 1 also illustrates that the client network 12 includes an administration or managerial device or server, such as a management, instrumentation, and discovery (MID) server 17 that facilitates communication of data between the network hosting the platform 20, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to a network 18. The network 18 may include one or more computing networks, such as other LANs, wide area networks (WAN), the Internet, and/or other remote networks, to transfer data between the client devices 14A-C and the network hosting the platform 20. Each of the computing networks within network 18 may contain wired and/or wireless programmable devices that operate in the electrical and/or optical domain. For example, network 18 may include wireless networks, such as cellular networks (e.g., Global System for Mobile Communications (GSM) based cellular network), IEEE 802.11 networks, and/or other suitable radio-based networks. The network 18 may also employ any number of network communication protocols, such as Transmission Control Protocol (TCP) and Internet Protocol (IP). Although not explicitly shown in FIG. 1, network 18 may include a variety of network devices, such as servers, routers, network switches, and/or other network hardware devices configured to transport data over the network 18.

In FIG. 1, the network hosting the platform 20 may be a remote network (e.g., a cloud network) that is able to communicate with the client devices 14A-C via the client network 12 and network 18. The network hosting the platform 20 provides additional computing resources to the client devices 14A-C and/or client network 12. For example, by utilizing the network hosting the platform 20, users of client devices 14A-C are able to build and execute applications for various enterprise, IT, and/or other organization-related functions. In one embodiment, the network hosting the platform 20 is implemented on one or more data centers 22, where each data center could correspond to a different geographic location. Each of the data centers 22 includes a plurality of virtual servers 24 (also referred to herein as application nodes, application servers, virtual server instances, application instances, or application server instances), where each virtual server can be implemented on a physical computing system, such as a single electronic computing device (e.g., a single physical hardware server) or across multiple-computing devices (e.g., multiple physical hardware servers). Examples of virtual servers 24 include, but are not limited to a web server (e.g., a unitary web server installation), an application server (e.g., unitary JAVA Virtual Machine), and/or a database server, e.g., a unitary relational database management system (RDBMS) catalog.

To utilize computing resources within the platform 20, network operators may choose to configure the data centers 22 using a variety of computing infrastructures. In one embodiment, one or more of the data centers 22 are configured using a multi-tenant cloud architecture, such that one of the server instances 24 handles requests from and serves multiple customers. Data centers with multi-tenant cloud architecture commingle and store data from multiple customers, where multiple customer instances are assigned to one of the virtual servers 24. In a multi-tenant cloud architecture, the particular virtual server 24 distinguishes between and segregates data and other information of the various customers. For example, a multi-tenant cloud architecture could assign a particular identifier for each customer in order to identify and segregate the data from each customer. Generally, implementing a multi-tenant cloud architecture may suffer from various drawbacks, such as a failure of a particular one of the server instances 24 causing outages for all customers allocated to the particular server instance.

In another embodiment, one or more of the data centers 22 are configured using a multi-instance cloud architecture to provide every customer its own unique customer instance or instances. For example, a multi-instance cloud architecture could provide each customer instance with its own dedicated application server(s) and dedicated database server(s). In other examples, the multi-instance cloud architecture could deploy a single physical or virtual server and/or other combinations of physical and/or virtual servers 24, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 20, and customer-driven upgrade schedules. An example of implementing a customer instance within a multi-instance cloud architecture will be discussed in more detail below with reference to FIG. 2.

Figure 2:
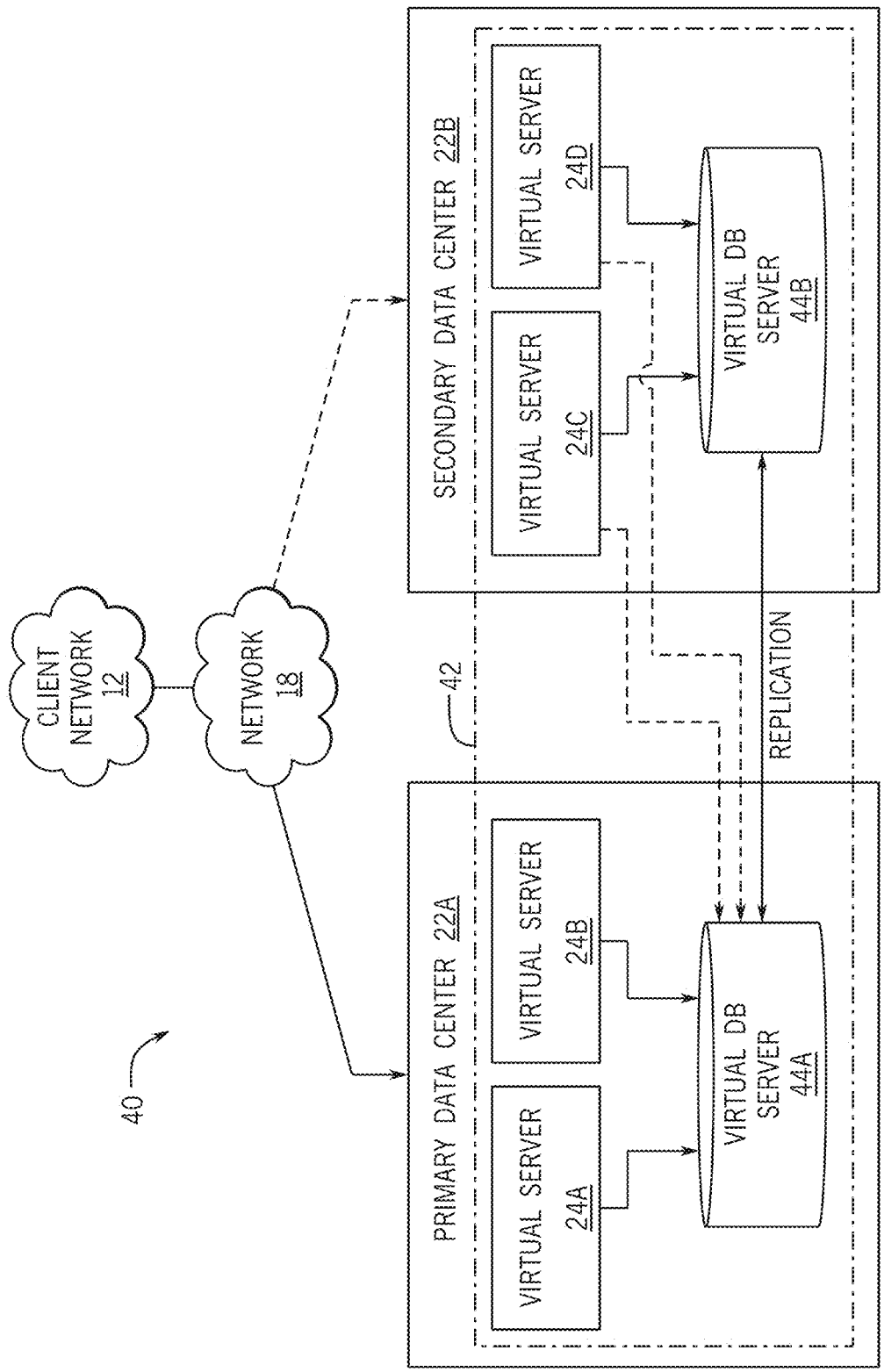
FIG. 2 is a block diagram of a computing device utilized in the distributed computing system of FIG. 1, in accordance with aspects of the present disclosure.

FIG. 2 is a schematic diagram of an embodiment of a multi-instance cloud architecture 40 where embodiments of the present disclosure may operate. FIG. 2 illustrates that the multi-instance cloud architecture 40 includes the client network 12 and the network 18 that connect to two (e.g., paired) data centers 22A and 22B that may be geographically separated from one another. Using FIG. 2 as an example, network environment and service provider cloud infrastructure client instance 42 (also referred to herein as a simply client instance 42) is associated with (e.g., supported and enabled by) dedicated virtual servers (e.g., virtual servers 24A, 24B, 24C, and 24D) and dedicated database servers (e.g., virtual database servers 44A and 44B). Stated another way, the virtual servers 24A-24D and virtual database servers 44A and 44B are not shared with other client instances and are specific to the respective client instance 42. Other embodiments of the multi-instance cloud architecture 40 could include other types of dedicated virtual servers, such as a web server. For example, the client instance 42 could be associated with (e.g., supported and enabled by) the dedicated virtual servers 24A-24D, dedicated virtual database servers 44A and 44B, and additional dedicated virtual web servers (not shown in FIG. 2).

In the depicted example, to facilitate availability of the client instance 42, the virtual servers 24A-24D and virtual database servers 44A and 44B are allocated to two different data centers 22A and 22B, where one of the data centers 22 acts as a backup data center. In reference to FIG. 2, data center 22A acts as a primary data center that includes a primary pair of virtual servers 24A and 24B and the primary virtual database server 44A associated with the client instance 42. Data center 22B acts as a secondary data center 22B to back up the primary data center 22A for the client instance 42. To back up the primary data center 22A for the client instance 42, the secondary data center 22B includes a secondary pair of virtual servers 24C and 24D and a secondary virtual database server 44B. The primary virtual database server 44A is able to replicate data to the secondary virtual database server 44B (e.g., via the network 18).

As shown in FIG. 2, the primary virtual database server 44A may back up data to the secondary virtual database server 44B using a database replication operation. The replication of data between data could be implemented by performing full backups weekly and daily incremental backups in both data centers 22A and 22B. Having both a primary data center 22A and secondary data center 22B allows data traffic that typically travels to the primary data center 22A for the client instance 42 to be diverted to the second data center 22B during a failure and/or maintenance scenario. Using FIG. 2 as an example, if the virtual servers 24A and 24B and/or primary virtual database server 44A fails and/or is under maintenance, data traffic for client instances 42 can be diverted to the secondary virtual servers 24C and/or 24D and the secondary virtual database server instance 44B for processing.

Although FIGS. 1 and 2 illustrate specific embodiments of a cloud computing system 10 and a multi-instance cloud architecture 40, respectively, the disclosure is not limited to the specific embodiments illustrated in FIGS. 1 and 2. For instance, although FIG. 1 illustrates that the platform 20 is implemented using data centers, other embodiments of the platform 20 are not limited to data centers and can utilize other types of remote network infrastructures. Moreover, other embodiments of the present disclosure may combine one or more different virtual servers into a single virtual server or, conversely, perform operations attributed to a single virtual server using multiple virtual servers. For instance, using FIG. 2 as an example, the virtual servers 24A-D and virtual database servers 44A and 44B may be combined into a single virtual server. Moreover, the present approaches may be implemented in other architectures or configurations, including, but not limited to, multi-tenant architectures, generalized client/server implementations, and/or even on a single physical processor-based device configured to perform some or all of the operations discussed herein. Similarly, though virtual servers or machines may be referenced to facilitate discussion of an implementation, physical servers may instead be employed as appropriate. The use and discussion of FIGS. 1 and 2 are only examples to facilitate ease of description and explanation and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 3:
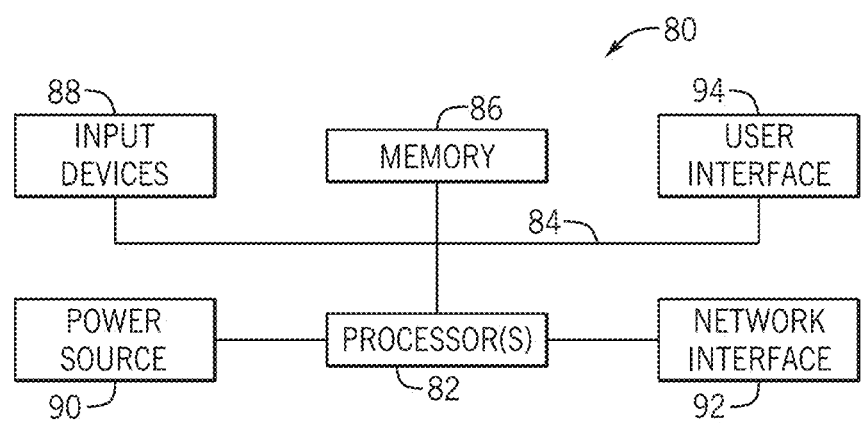
FIG. 3 is a block diagram of a computing device utilized in a computing system that may be present in FIG. 1 or 2, in accordance with aspects of the present disclosure.

With this in mind, and by way of background, it may be appreciated that the present approach may be implemented using one or more processor-based systems such as shown in FIG. 3. Likewise, applications and/or databases utilized in the present approach stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, an example computer system may include some or all of the computer components depicted in FIG. 3. FIG. 3 generally illustrates a block diagram of example components of a computing system 80 and their potential interconnections or communication paths, such as along one or more busses. As illustrated, the computing system 80 may include various hardware components such as, but not limited to, one or more processors 82, one or more busses 84, memory 86, input devices 88, a power source 90, a network interface 92, a user interface 94, and/or other computer components useful in performing the functions described herein.

The one or more processors 82 may include one or more microprocessors capable of performing instructions stored in the memory 86. Additionally or alternatively, the one or more processors 82 may include application-specific integrated circuits (ASICs), field-programmable gate arrays (FPGAs), and/or other devices designed to perform some or all of the functions discussed herein without calling instructions from the memory 86.

With respect to other components, the one or more busses 84 includes suitable electrical channels to provide data and/or power between the various components of the computing system 80. The memory 86 may include any tangible, non-transitory, and computer-readable storage media. Although shown as a single block in FIG. 1, the memory 86 can be implemented using multiple physical units of the same or different types in one or more physical locations. The input devices 88 correspond to structures to input data and/or commands to the one or more processor 82. For example, the input devices 88 may include a mouse, touchpad, touchscreen, keyboard and the like. The power source 90 can be any suitable source for power of the various components of the computing device 80, such as line power and/or a battery source. The network interface 92 includes one or more transceivers capable of communicating with other devices over one or more networks (e.g., a communication channel). The network interface 92 may provide a wired network interface or a wireless network interface. A user interface 94 may include a display that is configured to display text or images transferred to it from the one or more processors 82. In addition and/or alternative to the display, the user interface 94 may include other devices for interfacing with a user, such as lights (e.g., LEDs), speakers, and the like.

Figure 4:
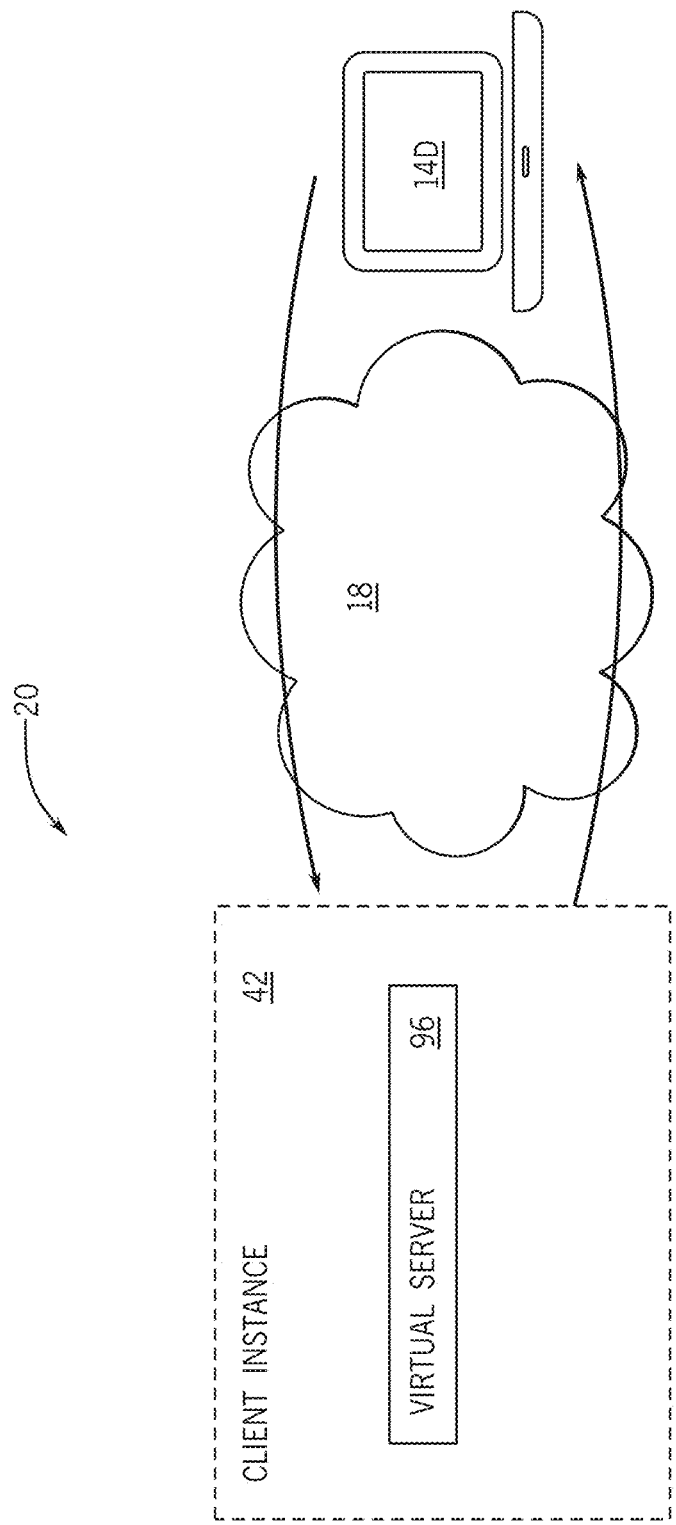
FIG. 4 is a block diagram illustrating an embodiment in which a virtual server supports and enables the client instance, in accordance with aspects of the present disclosure.

As mentioned above, present embodiments are directed toward. . . . With the foregoing in mind, FIG. 4 is a block diagram illustrating an embodiment in which a virtual server 96 supports and enables the client instance 42, according to one or more disclosed embodiments. More specifically, FIG. 4 illustrates an example of a portion of a service provider cloud infrastructure, including the cloud-based platform 20 discussed above. The cloud-based platform 20 is connected to a client device 14D via the network 18 to provide a user interface to network applications executing within the client instance 42 (e.g., via a web browser of the client device 14D). Client instance 42 is supported by virtual servers similar to those explained with respect to FIG. 2, and is illustrated here to show support for the disclosed functionality described herein within the client instance 42. Cloud provider infrastructures are generally configured to support a plurality of end-user devices, such as client device 14D, concurrently, wherein each end-user device is in communication with the single client instance 42. Also, cloud provider infrastructures may be configured to support any number of client instances, such as client instance 42, concurrently, with each of the instances in communication with one or more end-user devices. As mentioned above, an end-user may also interface with client instance 42 using an application that is executed within a web browser.

Figure 5:
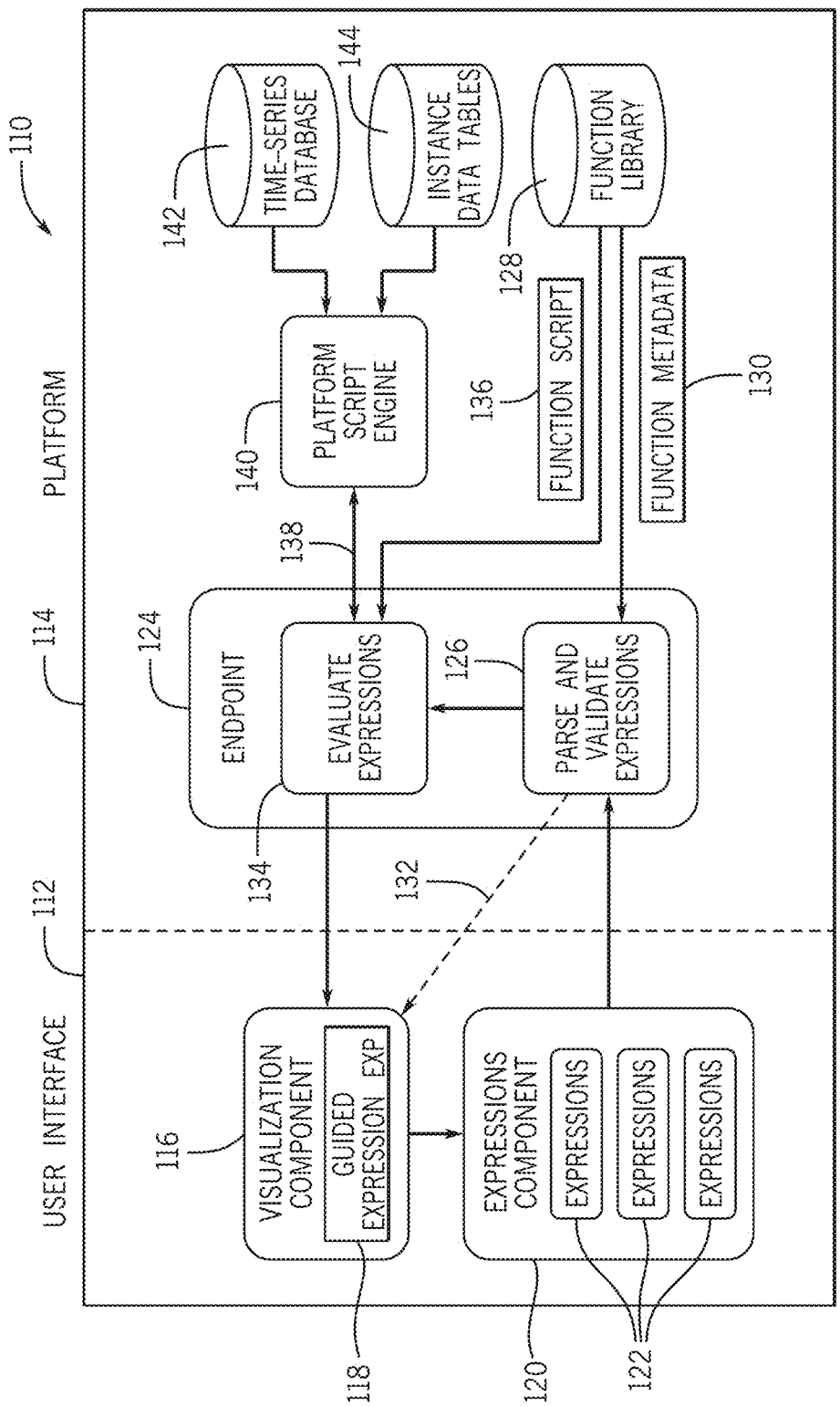
FIG. 5 is a block diagram illustrating an architecture used to implement the Advanced Insights Explorer tool, in accordance with aspects of the present disclosure.

FIG. 5 is a block diagram illustrating an architecture 110 used to implement the Advanced Insights Explorer tool, in accordance with aspects of the present disclosure. As illustrated, a user interface system 112 may be communicatively coupled with the platform 114 to provide the Advanced Insights Explorer functionality described herein. In particular, a visualization component 116 of the user interface component 112 may provide a guided expression generation experience graphical user interface (GUI) 118, which may guide a user through various user friendly prompts to generate expressions for resultant data to be presented by the visualization component 116. The guided expression generation GUI 118 will be described in more detail below.

Based upon interaction with the guided expression experience GUI 118, the expressions component 120 may generate one or more expressions 122 that represent metric data criteria that should be returned from the platform 114 to the visualization component 116 for rendering. The expressions 122 enable scripting (e.g., Javascript) to be executed via the platform 114 to obtain relevant metric data associated with the scripts, as discussed in more detail below.

Upon generation of the expressions 122 at the expressions component 120, the user interface 112 may provide the expressions 122 to the platform 114. More specifically, the platform 114 may include an endpoint 124 (e.g., a representational state transfer (REST) endpoint). As may be appreciated, the endpoint 124 may accept requests from the user interface 112 and provide results to user interface 112 based upon those requests.

As illustrated in FIG. 5, the endpoint 124 may receive the expressions 122 and parse and validate the expressions, as indicated by parse and validation logic block 126. As mentioned herein, a function library 128 may provide a set of exposed functions that may be used for expression 122 evaluation. One or more functions useful in providing solutions for the expressions 122 are identified from the function library 128, based upon the expressions 122.

To validate the expressions 122, the parse and validation logic block 126 may receive function metadata 130 that indicates valid attributes for functions in the function library 128. The metadata is compared to information in the expressions 122 to identify invalid attributes of the expressions. When invalid attributes exist, an optional feedback indication (as indicated by arrow 132) may be provided to the visualization component 116, which generates a resultant error visualization, indicating that there was invalid data in the generated expressions 122. This enables the user to reform the expressions 122.

After the parsed expressions 122 are validated, the endpoint 124 evaluates the expressions, as indicated by logic block 134. In particular, one or more function scripts 136 associated with the one or more identified functions are retrieved by the logic block 134. Additional data attributes provided in the expressions 122 may be merged with the function scripts 136, resulting in customized function scripts specific to the expressions 122.

As indicated by arrow 138, the customized function scripts are provided to the platform scripting engine 140. The platform scripting engine 140 executes the scripts, using available metric data. For example, in the current embodiment, the platform scripting engine 140 is communicatively coupled to a time-series database 142 and to instance data tables 144. As may be appreciated, a time-series database is a special purpose database that is optimized for time-stamped or time series data. Time series are metrics tracked and aggregated over time. The instance data tables 144 provide metric data for a particular instance of services for a particular enterprise.

Using the time-series database 142 and the instance data tables 144, the platform scripting engine 140 may execute the customized scripts and determine resultant data to be returned for the customized scripts. The results are returned to logic block 134 and are transmitted from the endpoint 124 back to the visualization component 116, which generates a visualization based upon the returned data.

Figure 6:
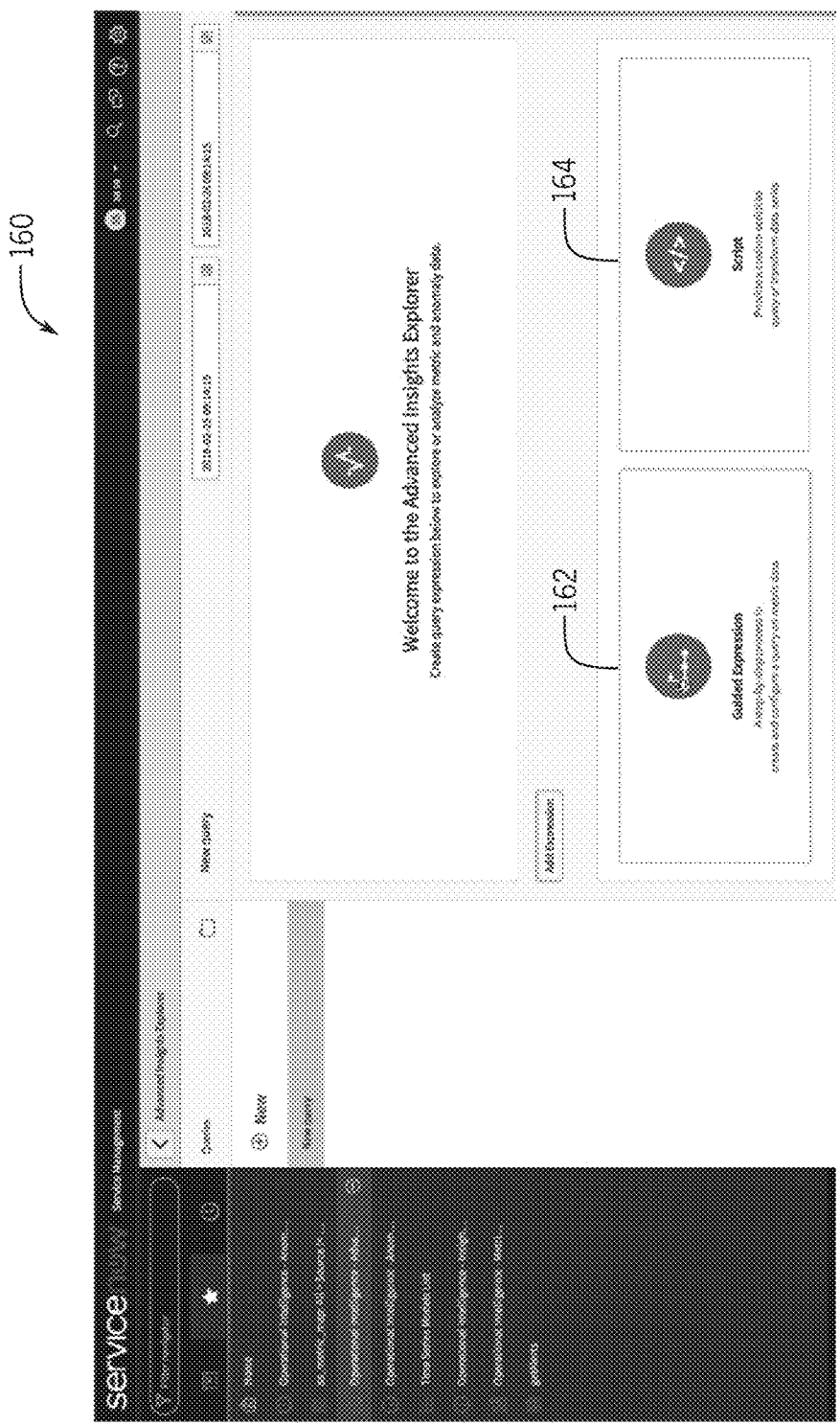
FIG. 6 is a schematic diagram illustrating a main menu screen of the Advanced Insights Explorer tool, in accordance with aspects of the present disclosure.

Having discussed the basic architecture of the Advanced Insights Explorer tool, the discussion now turns to a more detailed discussion of visualizations and interactions with the Advanced Insights Explorer tool. FIG. 6 is a schematic diagram illustrating a main menu screen 160 of the Advanced Insights Explorer tool, in accordance with aspects of the present disclosure. As illustrated, the main menu 160 provide two basic options. First, a guided expression option 162, when selected, renders a guided experience for generating expressions. The guided experience is described in more detail with regard to FIGS. 7-29. Additionally and/or alternatively, the script option 164 may be selected. The script option 164 enables a user to create custom scripts to query or transform a data series. This is discussed in more detail with regard to FIGS. 30 and 31.

Figure 7:
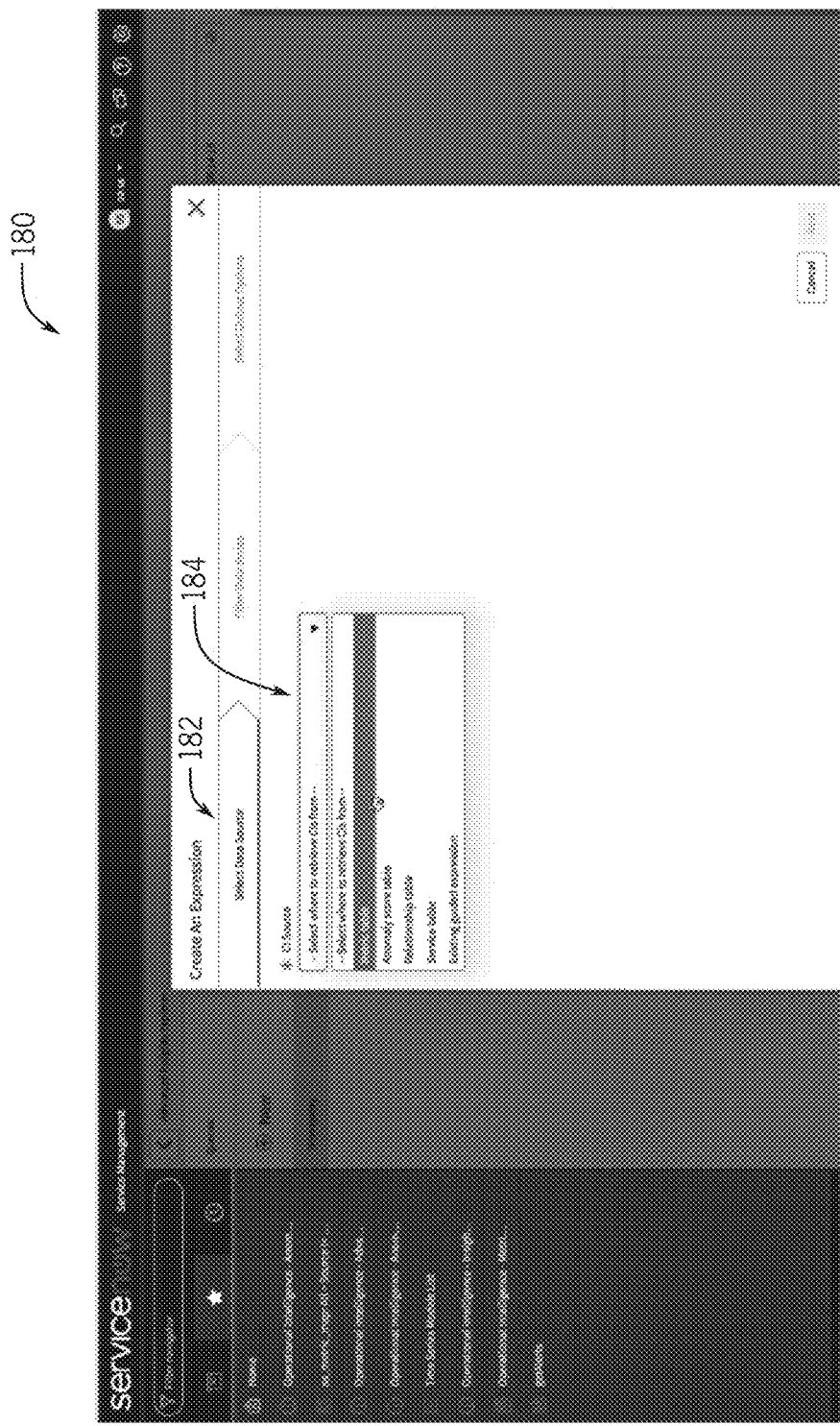
FIGS. 7-12 are schematic diagrams illustrating a guided expression generation experience, in accordance with aspects of the present disclosure.

FIGS. 7-12 are schematic diagrams illustrating a guided expression generation experience, in accordance with aspects of the present disclosure. FIG. 7 is a GUI view 180 for a guided first step 182 of the guided expression generation experience. As illustrated, the first step 182 includes gathering information related to the data source for the metric data. For example, a CI source dropdown 184 allows for selection of particular CIs of interest from data sources, including: metric table(s), anomaly score table(s), relationship table(s), service table(s), or the list of existing guided expressions. As may be appreciated, the metric table may include metric data for a particular instance. The anomaly score table may include anomaly scores for the instance, the relationship table may include relationships between CIs for the instance, the service table may include services for the CIs, and the existing guided expression provides results of previously generated expressions.

Figure 8:
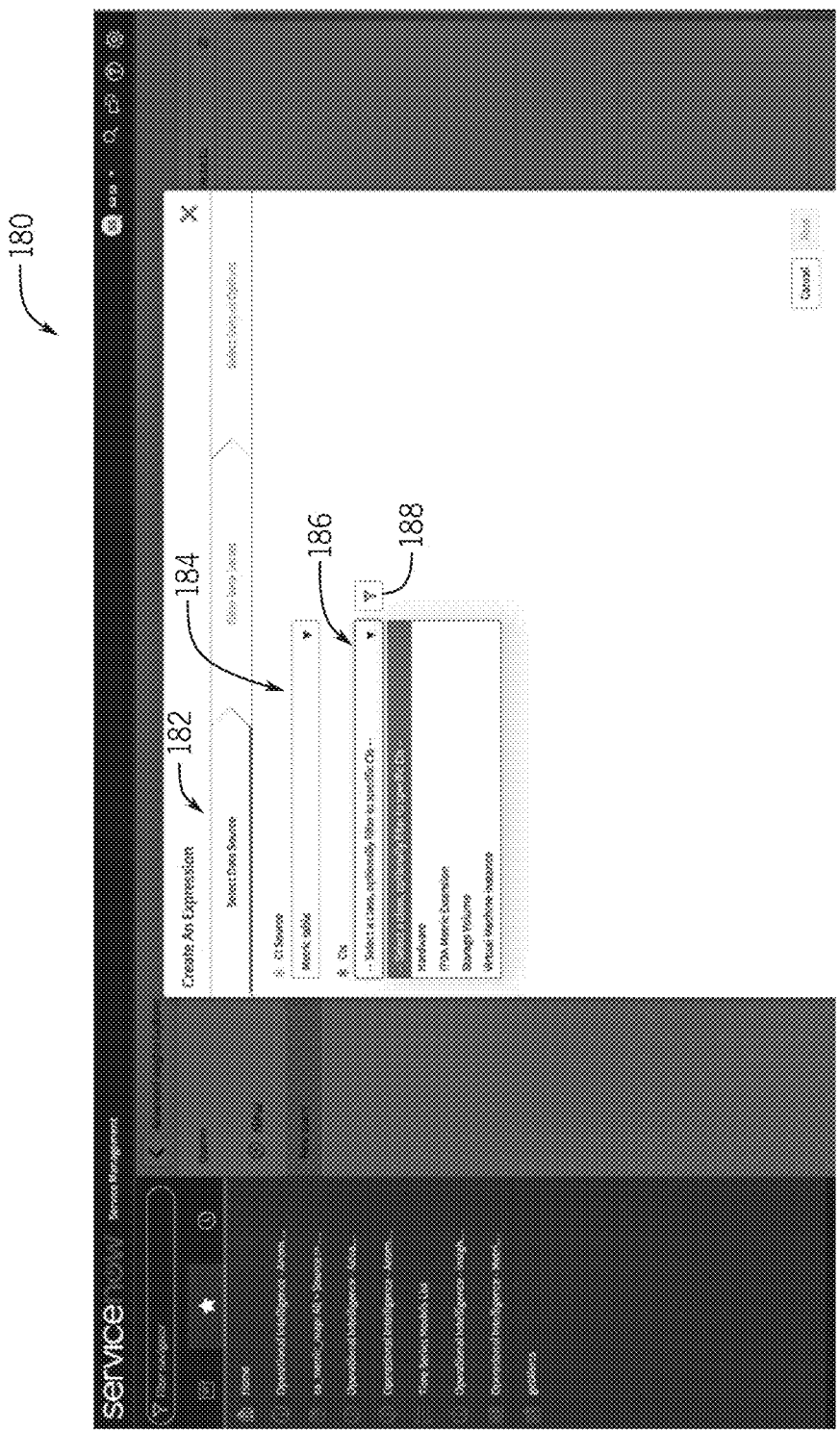

As selections are made, additional data source selections may be presented. For example, after selection of the metric table in CI source dropdown 184, the CIs selection dropdown 186 is provided for selecting a class of CIs, as illustrated in FIG. 8. For example, the available classes may include a hardware selection, an ITOA metric extension selection, a storage volume selection, a virtual machine instance selection, etc. Additionally, filter selection 188 may be used to filter particular ones of a class of CIs.

Figure 9:
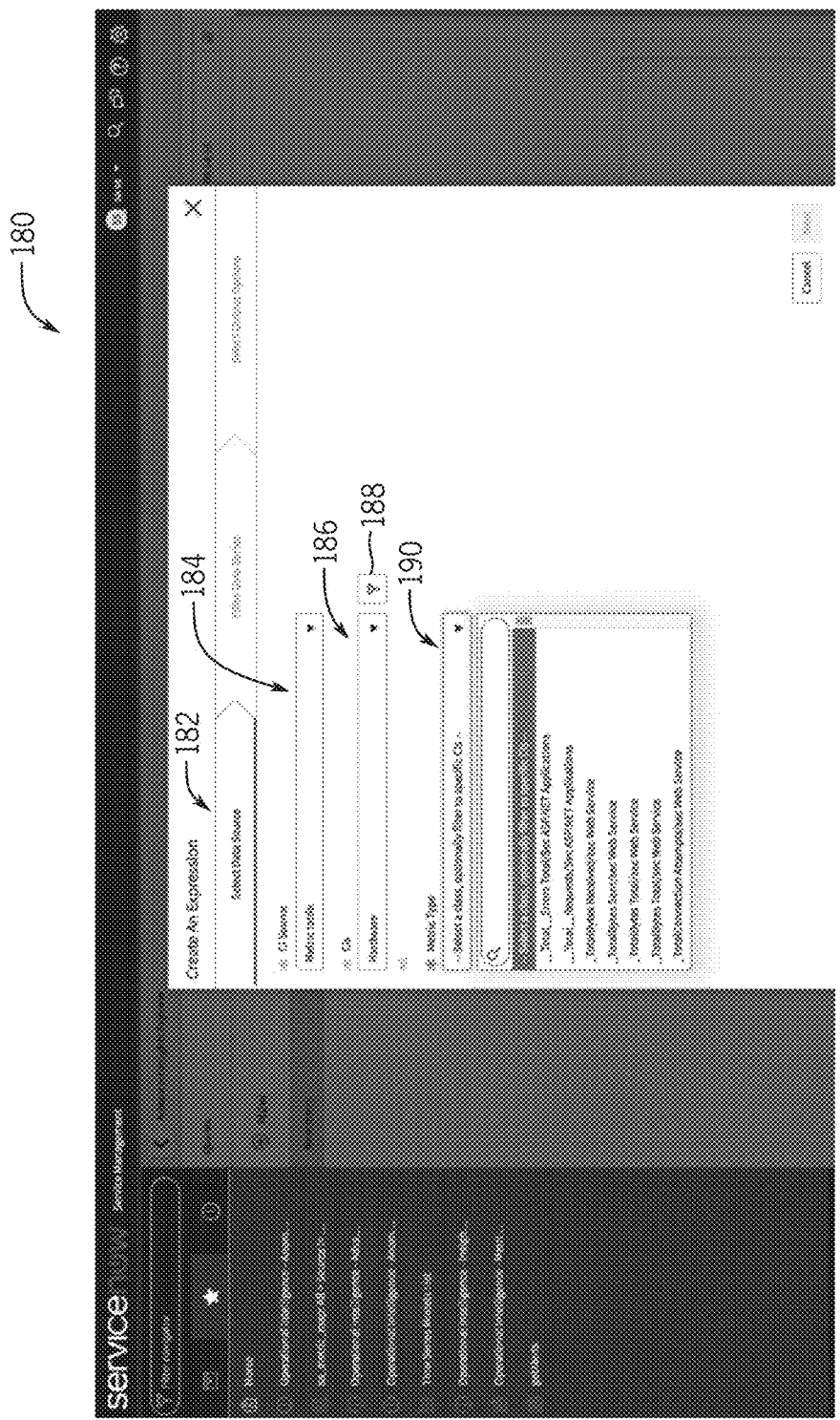
Figure 10:
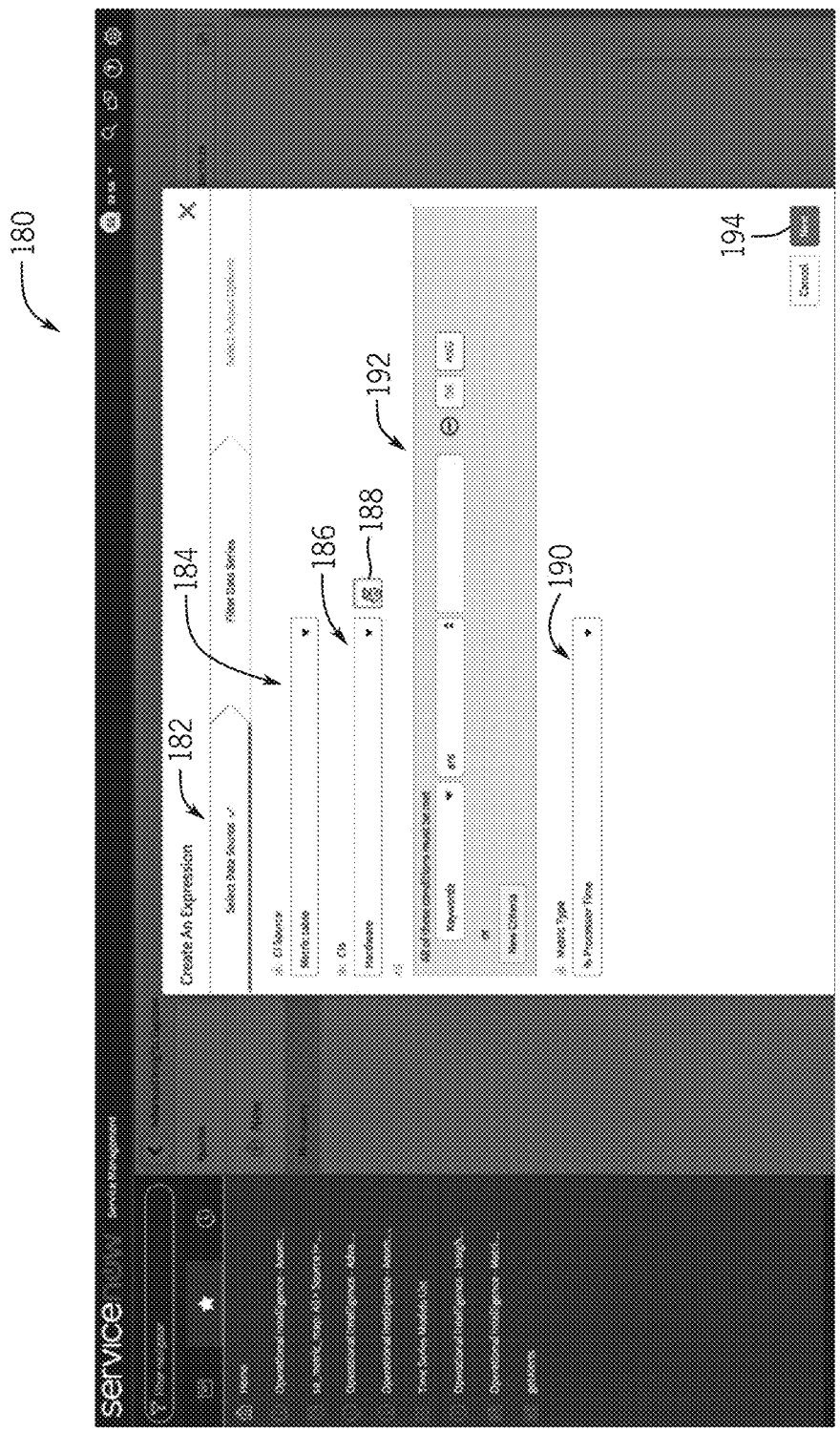
Figure 19:
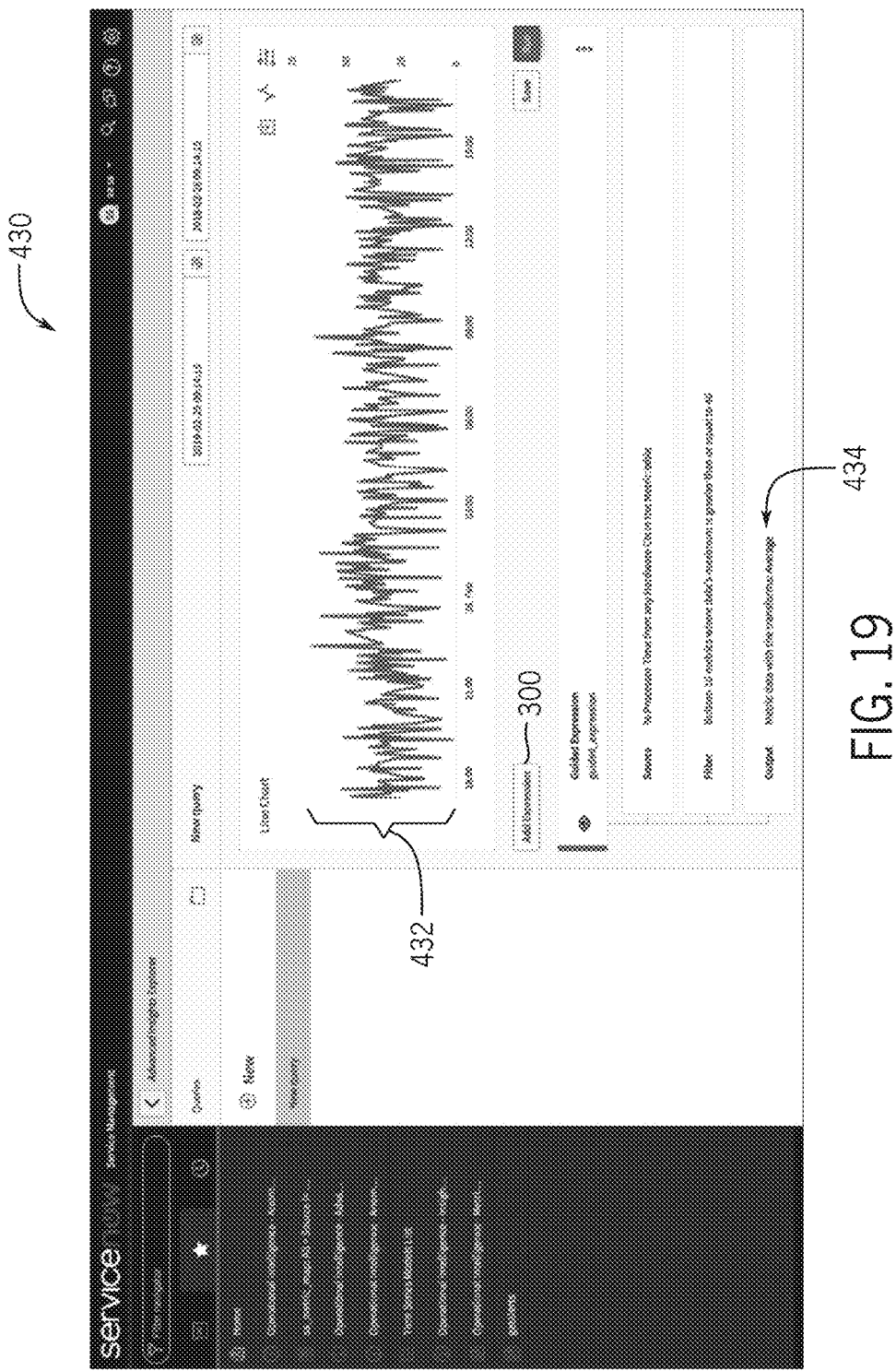
FIG. 19 is a schematic diagram illustrating the results of the change illustrated in FIG. 18, in accordance with aspects of the present disclosure.

Upon selection of an option in selector 186, a metric type selector 190 may be presented, which provides metric types specifically associated with the selected CI source and/or CIs from selectors 184 and/or 186, as illustrated in FIG. 9. In FIG. 19, a "% Processor Time" selection is selected for the selector 190. In addition, FIG. 10 illustrates selection of the filter selection 188, which exposes a filter criteria box, which allows entry of conditions to be met for selection of CIs.

Figure 11:
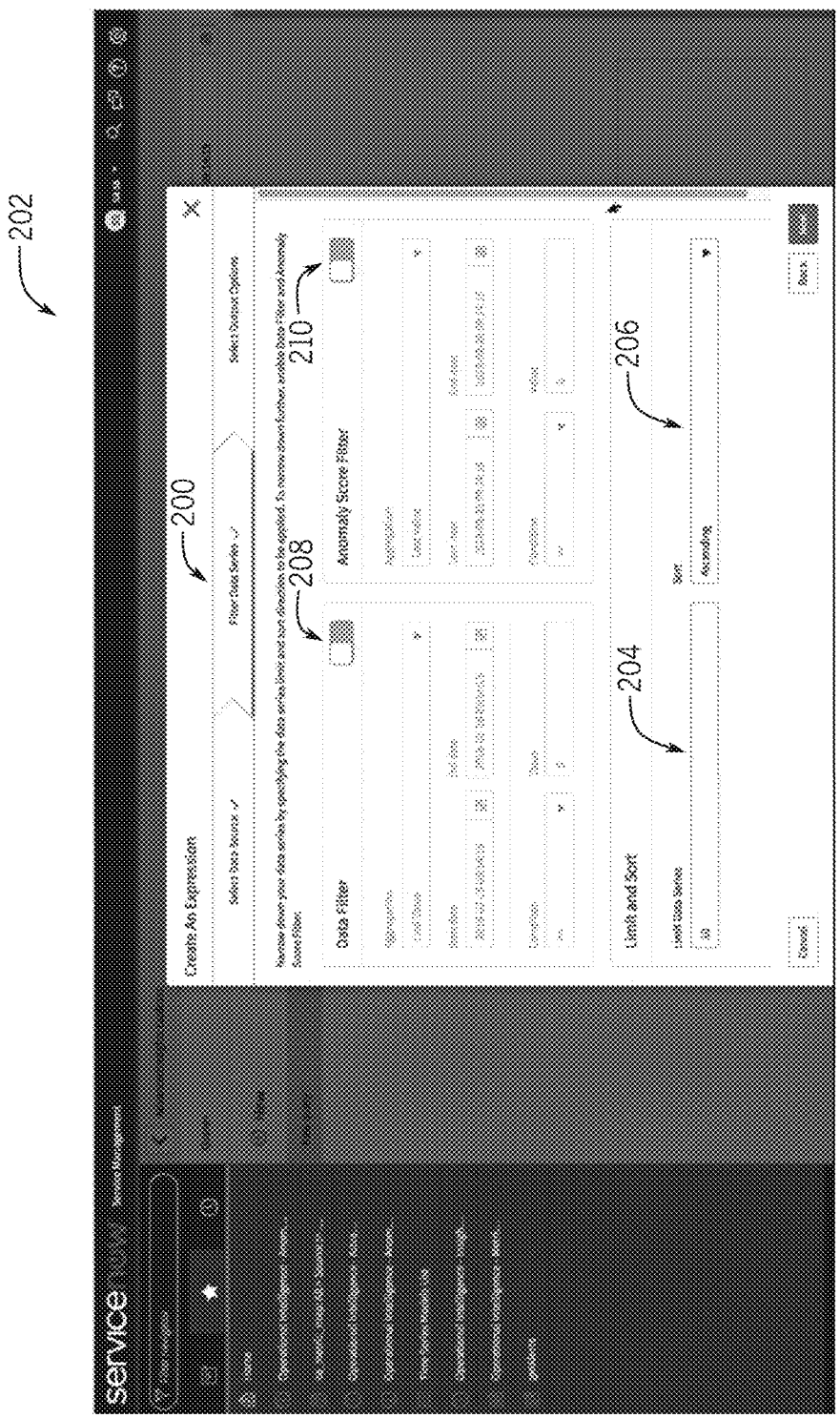

Upon completion of interaction with the first step 182, the user may select a progression request, by selecting the "Next" button 194, taking the user to the next guided step 200, which is shown in FIG. 11. As illustrated in FIG. 11, a filter data series menu 202 is presented. This allows the user to narrow down data series by specifying the data series limit (in the Limit Data Series field 204) and/or sort direction to be applied (using the Sort selector 206). Here, the data series is limited to 10 CIs that are selected and sorted based upon an ascending order of the data.

Further, data filters and anomaly score filters may be applied, as will be discussed in detail below. For example, when the data filter toggle 208 is activated, additional data filters may be applied. Further, when anomaly score filter toggle 210 is activated, anomaly-based filtering may be applied, such that only data meeting the anomaly criteria is presented in the results.

Figure 12:
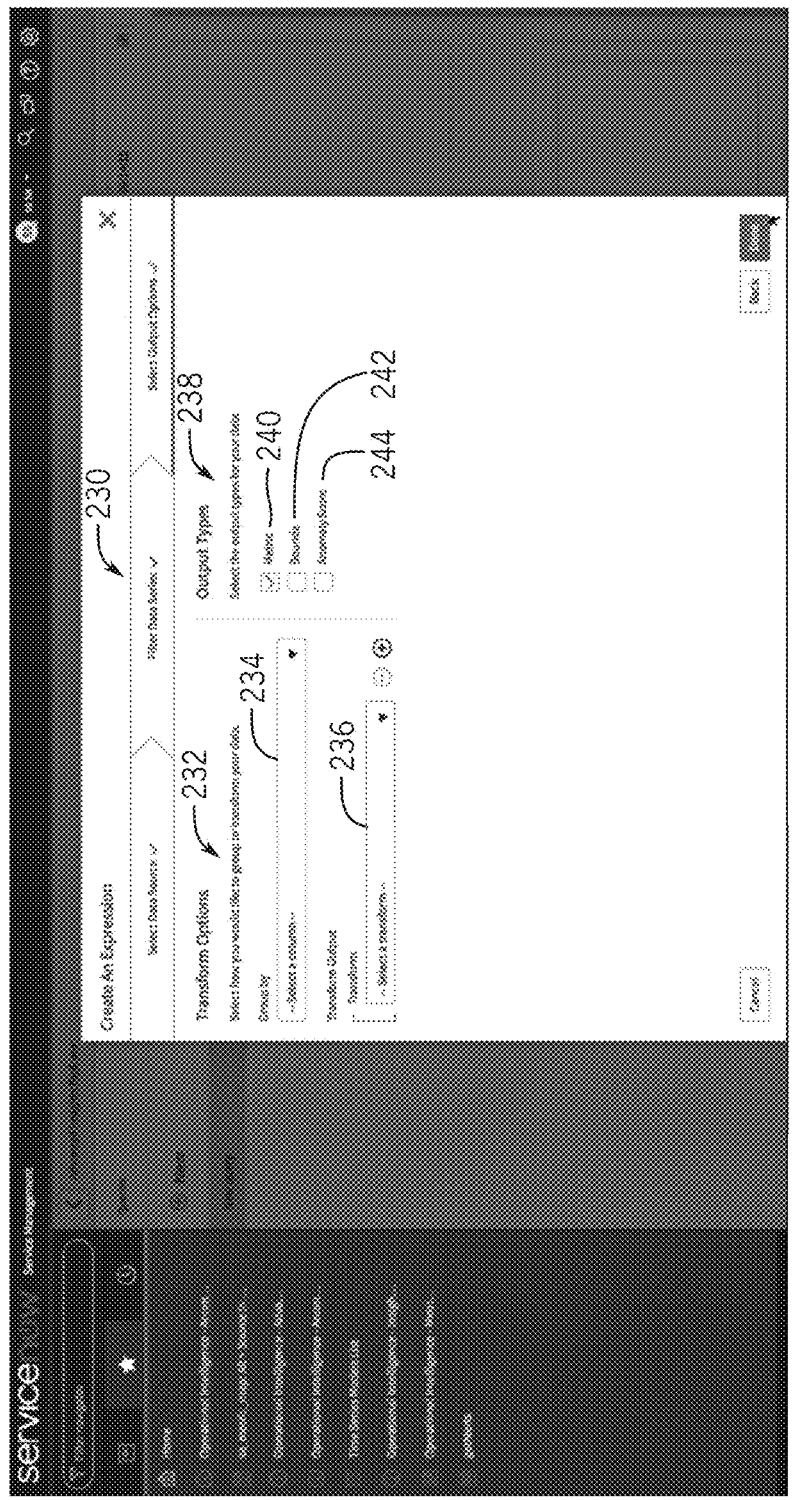

After the data filtering step is completed, the user may be guided to provide output options for the sourced and filtered data. FIG. 12 illustrates an output options selection menu 230. The output options selection menu 230 includes a transform options section 232 that includes a group by selector 234 that enables selections for particular columns to group data by and a transform output selector 236 for selecting transforms for the data. The transform output selector 236 aggregates metric data at each time period and outputs a value based upon the type of aggregation (e.g., average, minimum, maximum, sum, count median, standard deviation, etc.).

The output options selection menu 230 also includes an output types section 238. The output types section 238 includes selectors for particular types of data that may be presented in the results. For example, in the current embodiment, the metric selector 240 is selected, which results in presentation of metric data for the filtered data. Other options include a bounds selector 242, which results in upper and/or lower bounds of the filtered data being presented, and an anomaly score selector 244, which results in anomaly scores for the filtered data being presented.

Figure 13:
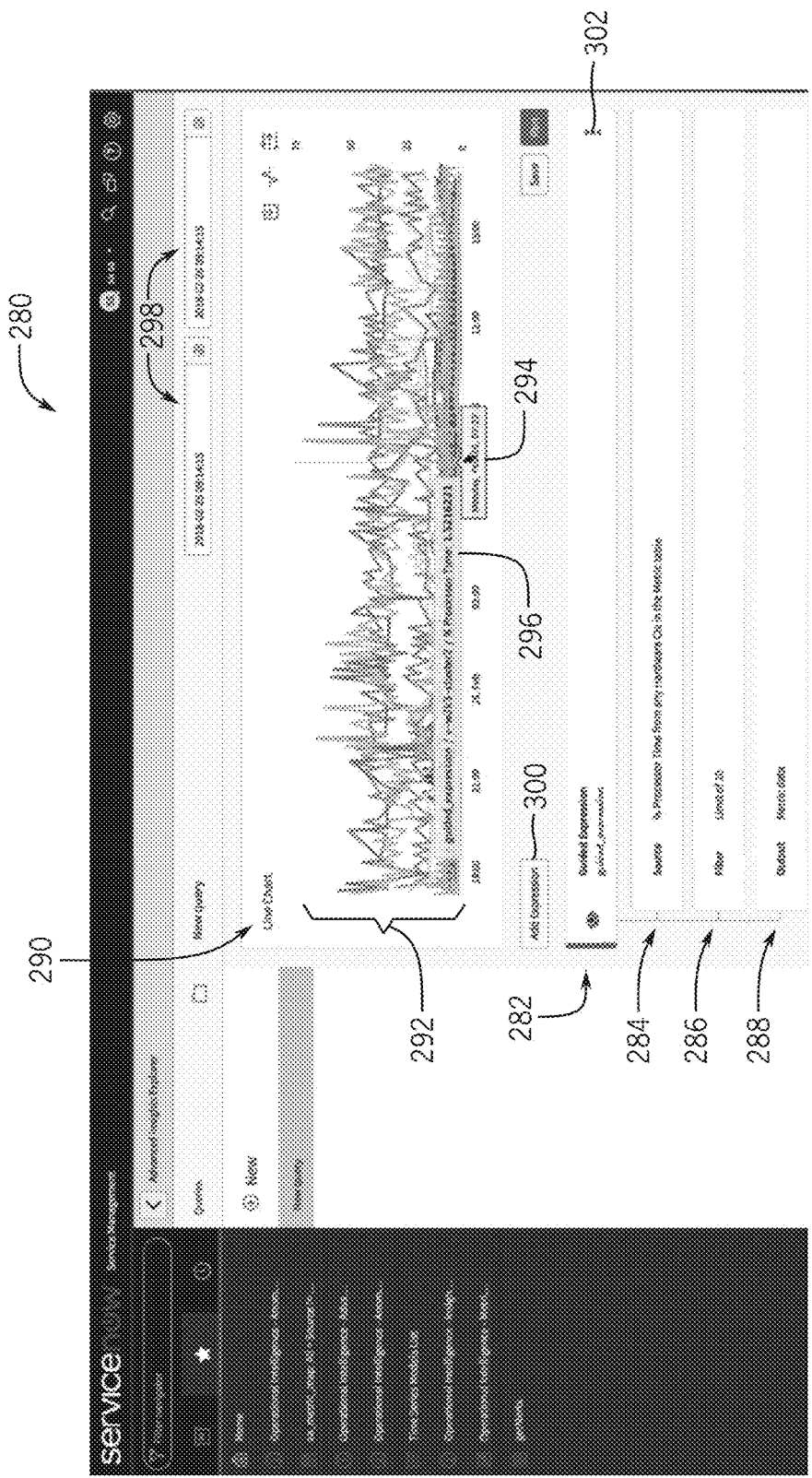
FIG. 13 is a schematic diagram illustrating expression results generated based upon the generated query of FIGS. 7-12, in accordance with aspects of the present disclosure.

Upon indication that the output options have been selected (e.g., by selecting done 246), the expressions are generated, executed, and the results of the selections are presented. FIG. 13 is a schematic diagram illustrating a results visualization 280 with expression results generated based upon the generated query of FIGS. 7-12, in accordance with aspects of the present disclosure. The results visualization 280 includes a summary 282 of the created guided expression. For example, as illustrated, the source 284 is displayed, the filters 286 are displayed, and the output option selections 288 are displayed. Additionally, a line chart 290 includes line data 292 for CIs that are a part of the filtered data. Here, the top 10 CIs with "% Processor Time from any Hardware CIs in the Metric table" are provided. The line data 292 is interactive. As a pointer hovers over portions of the line data 292, particular line data for the hovered over portion is provided. For example, hovering over a particular data line for a particular CI (V-w2k3-cluster2) at Monday, February 26, 07:27 (as indicated by tooltip 294), a results tooltip 296 indicates that the % Processor Time for the V-w2k3-cluster2 is 1.5216221. Range selectors 298 may be provided to alter the time range for the line data.

Additional expressions may be added to the results visualizations 280 by selecting option 300. Additional options for the generated expressions, such as editing, duplicating, or deleting the guided expression may be performed by selecting option 302.

Figure 14:
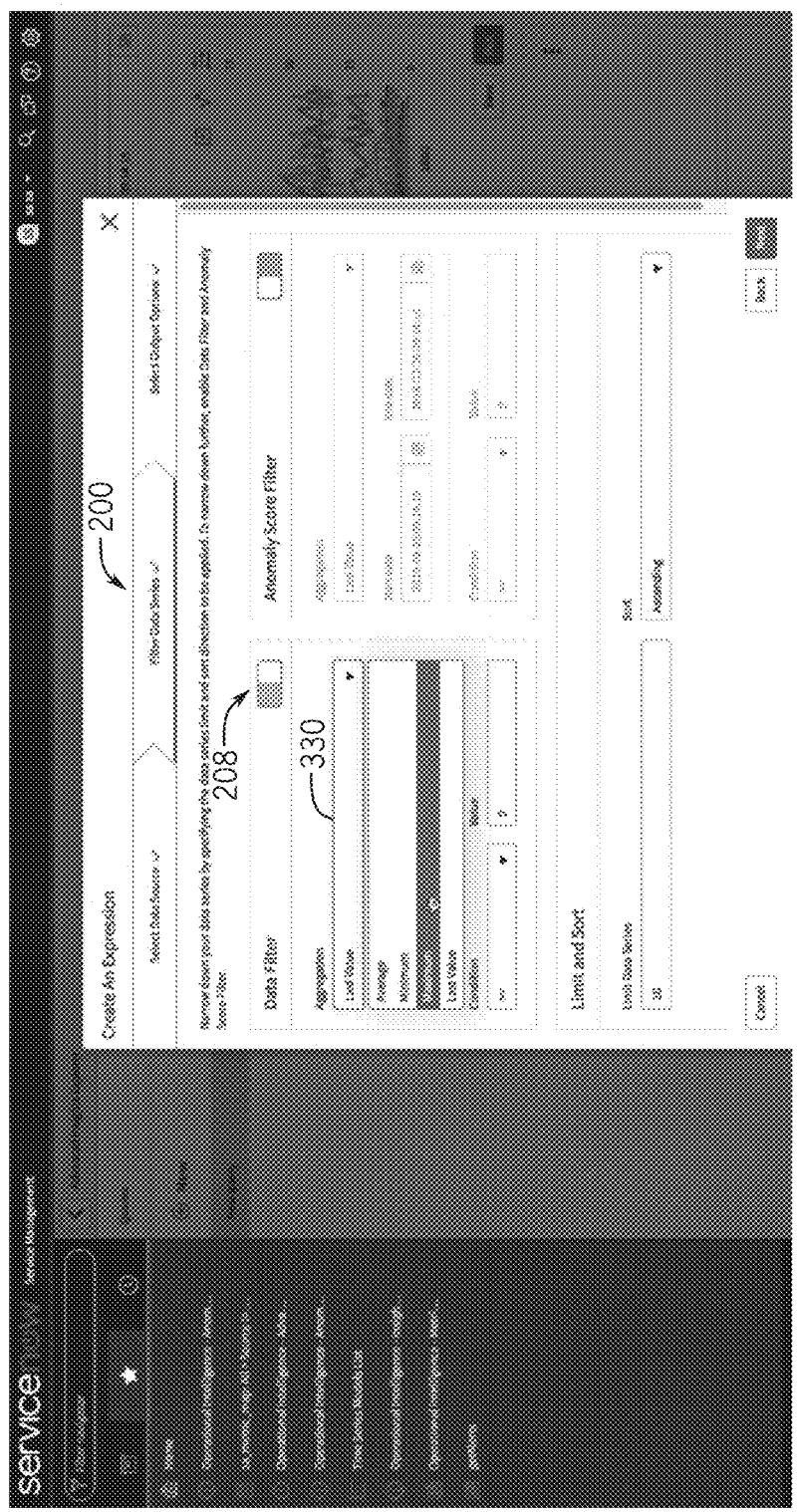
FIGS. 14 and 15 are schematic diagrams illustrating revised expressions, in accordance with aspects of the present disclosure.
Figure 15:
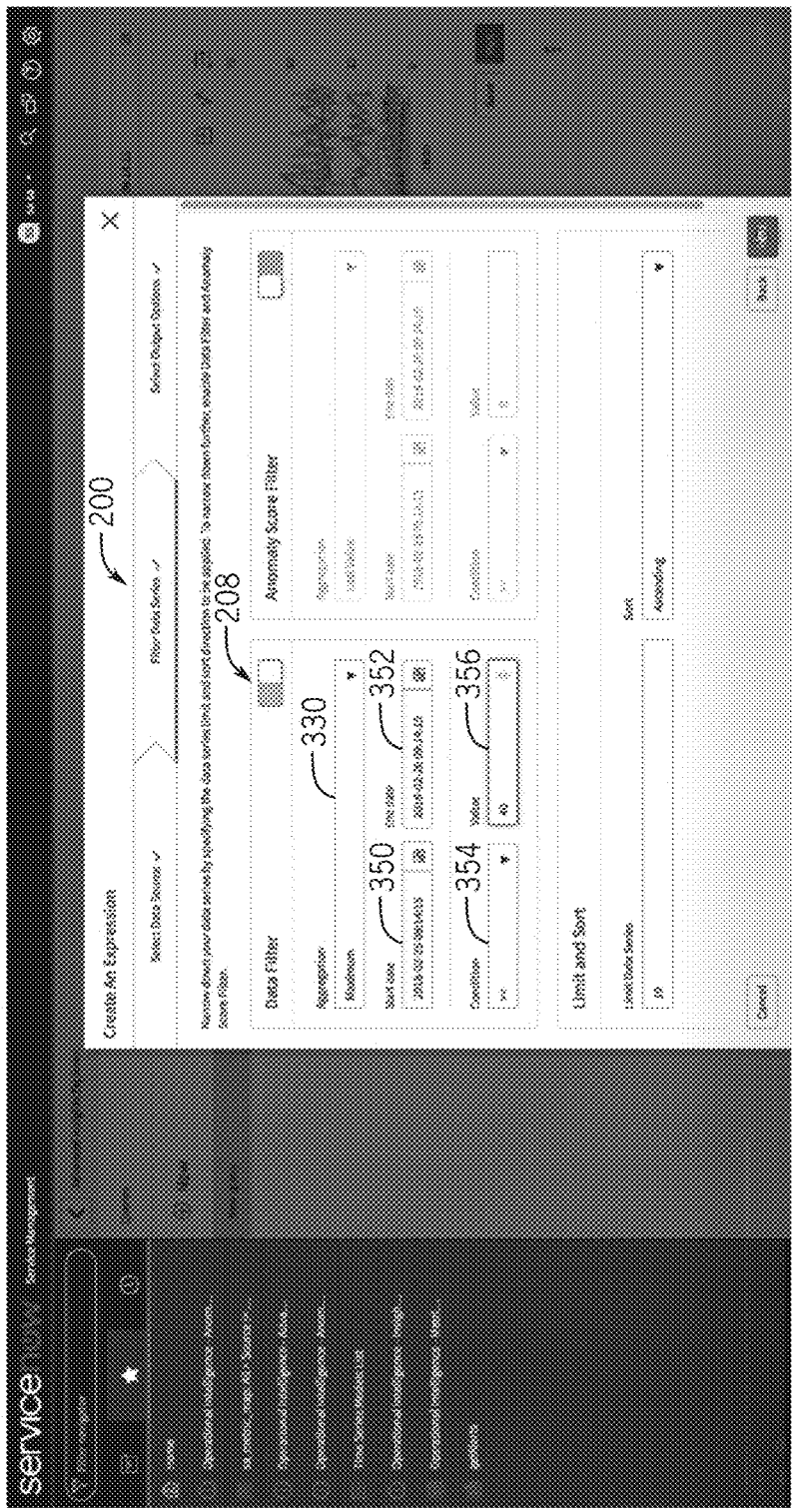

It may be beneficial to edit a guided expression. For example, to hone in on particular results, additional filters may be applied to further isolate particular results. FIGS. 14 and 15 are schematic diagrams illustrating revised expressions, in accordance with aspects of the present disclosure. In FIG. 14, upon selecting an edit expressions option and navigating to the data series filtering step 200, the data filter toggle 208 is activated, to add a data filter. Here, an aggregation selector 330 is set to maximum. Other aggregating selections include average, minimum, and last value. As may be appreciated, the aggregation selector aggregates the metric data for CIs, enabling filtering based upon characteristics of the aggregated values. For example, when "average" is selected, the aggregation of metric data for each of the CIs in the results are averaged and the selected conditions are applied as a filter. When minimum is selected, a minimum value of the aggregated metric data is used for the condition selections for filtering. When maximum is selected, a maximum value of the aggregated metric data is used for the condition selections for filtering. When last value is selected, the last value of the aggregated metric data is used for the condition selections for filtering.

FIG. 15 illustrates condition selections selected after the maximum selection is selected for the aggregation selector 330. Here, a start date 350 of 2018 Feb. 24 09:14:14 is selected. An end date 352 of 2018 Feb. 26 09:14:15 is selected. A condition 354 of >= is selected (other relational operators could be selected) and a value 356 associated with the condition 354 is selected.

Figure 16:
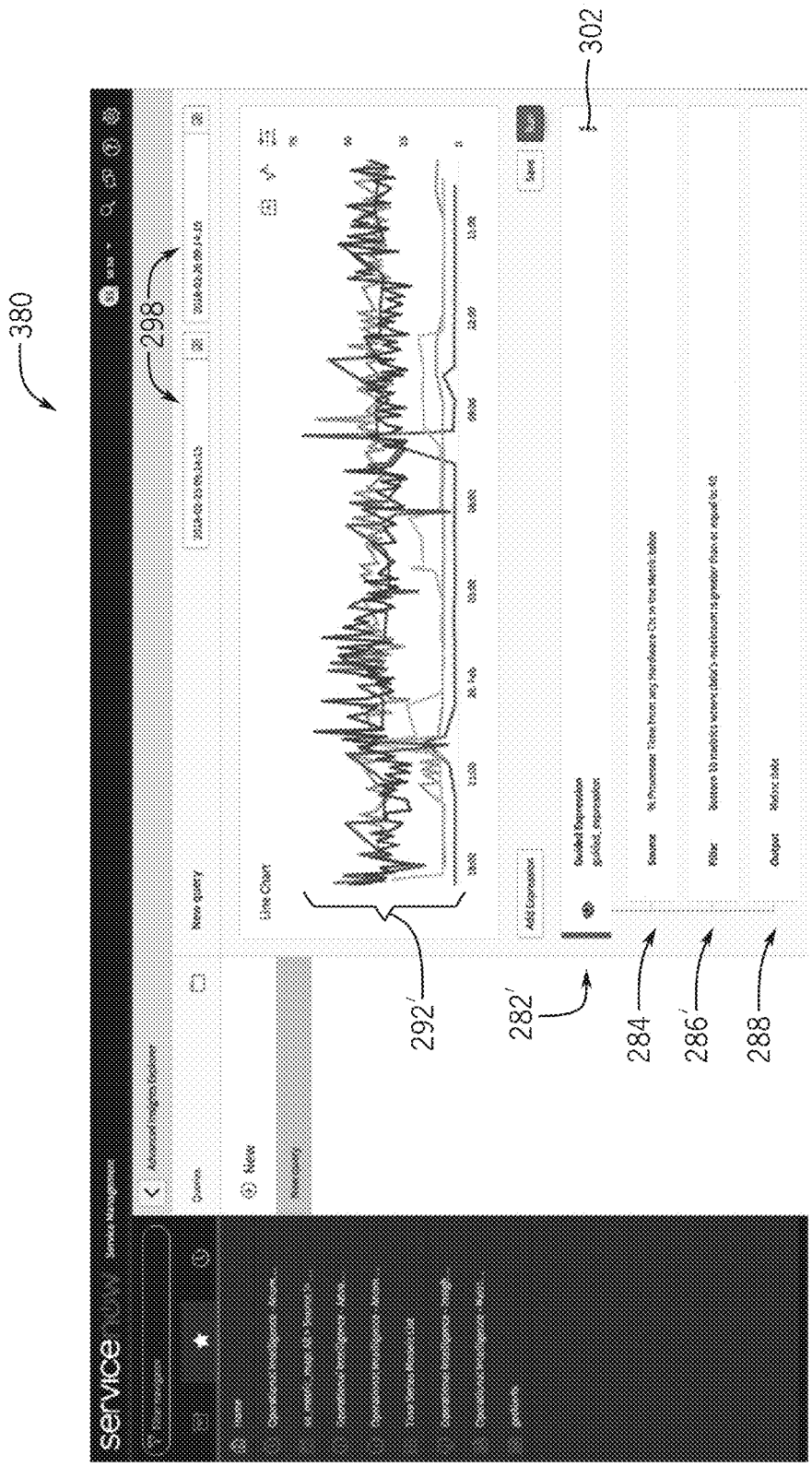
FIG. 16 is a schematic diagram illustrating visualized results for the revised expression, in accordance with aspects of the present disclosure.

FIG. 16 is a schematic diagram illustrating visualized results 380 for the revised expression, in accordance with aspects of the present disclosure. The visualized results are the same as those in FIG. 13, except that modified data lines 292' has certain data lines filtered out and the added filter is described in modified filter 286', based upon the additional data filter selected in FIG. 15.

Figure 17:
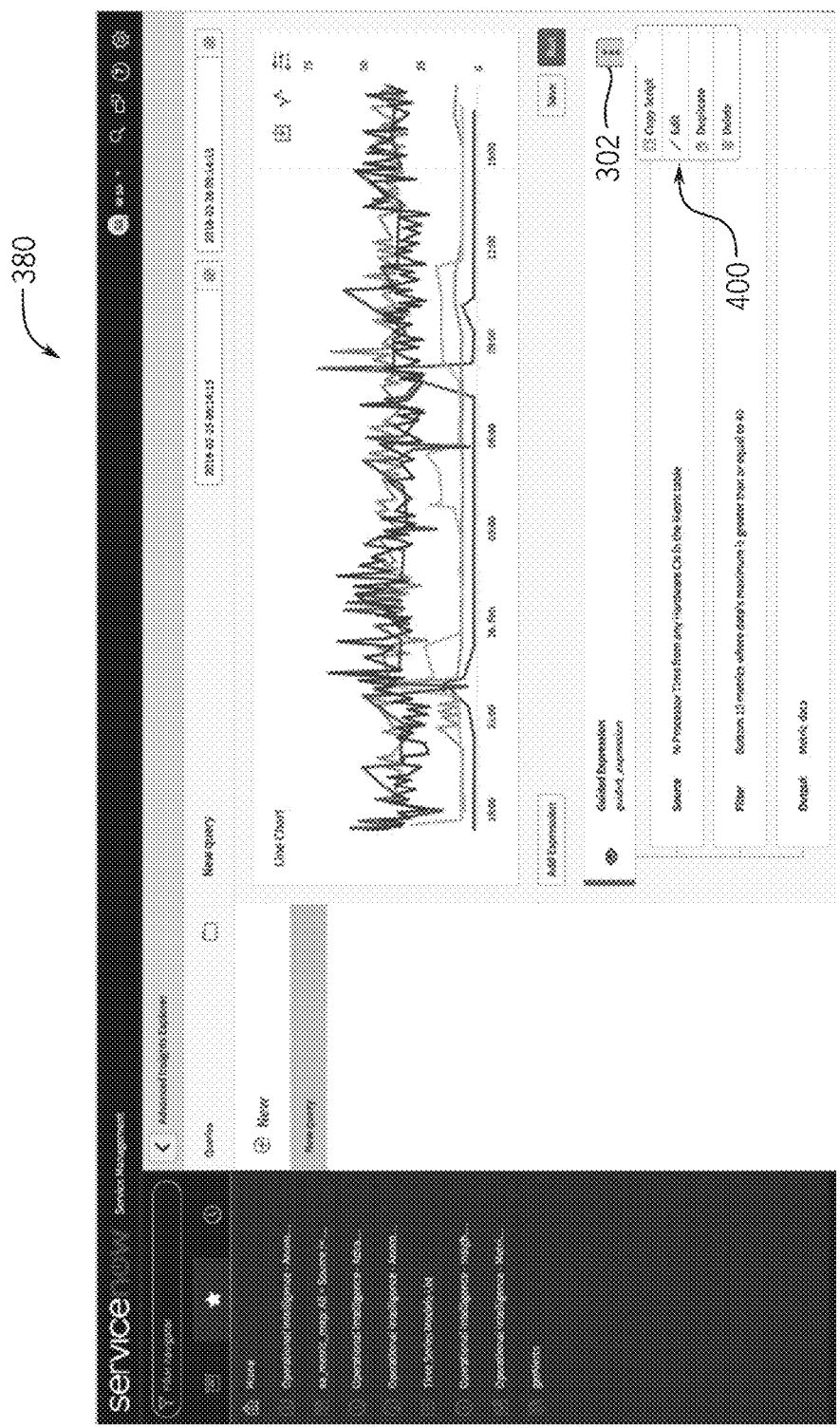
FIG. 17 is a schematic diagram illustrating an expression revision menu for modifying expressions, in accordance with aspects of the present disclosure.

FIG. 17 is a schematic diagram illustrating the visualized results 380, where an expression revision menu 400 for modifying expressions is presented by selecting option 302, in accordance with aspects of the present disclosure. As discussed above, the revision menu 400 may include options for editing the expressions (which guides the user back through the guided expression generation experience), a duplicate option that duplicates the generated expressions, and a delete option that deletes the generated expressions. In addition, the revision menu 400 may include a copy script option. As mentioned above, the generated expressions are associated with a script that is executed by an execution engine. The copy script option copies this underlying option to the computer running the user interface.

Figure 18:
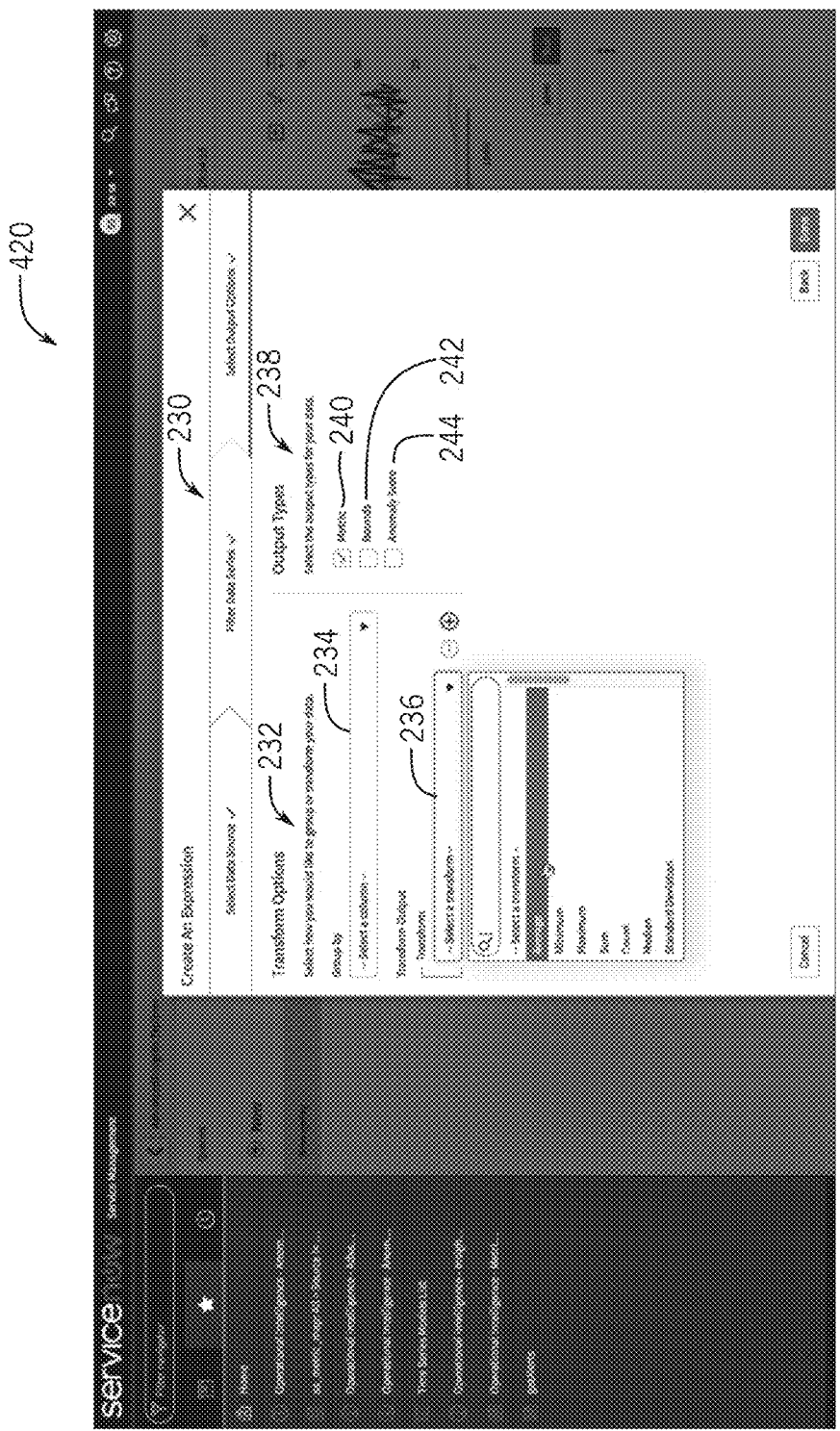
FIG. 18 is a schematic diagram illustrating a change to an output aggregation setting, in accordance with aspects of the present disclosure.

FIG. 18 is a schematic diagram illustrating a visualization 420 with a change to an output aggregation setting, in accordance with aspects of the present disclosure. Here, the transform selector 236 is set to average, which will result in a data line that represents the average of all of the CIs of the filtered data over time. FIG. 19 is a schematic diagram illustrating the results 430 of the change illustrated in FIG. 18, in accordance with aspects of the present disclosure. As illustrated, the data line 432 provides the average for the CIs in the filtered data set over the specified range of time. The transform type is also described 434.

Figure 20:
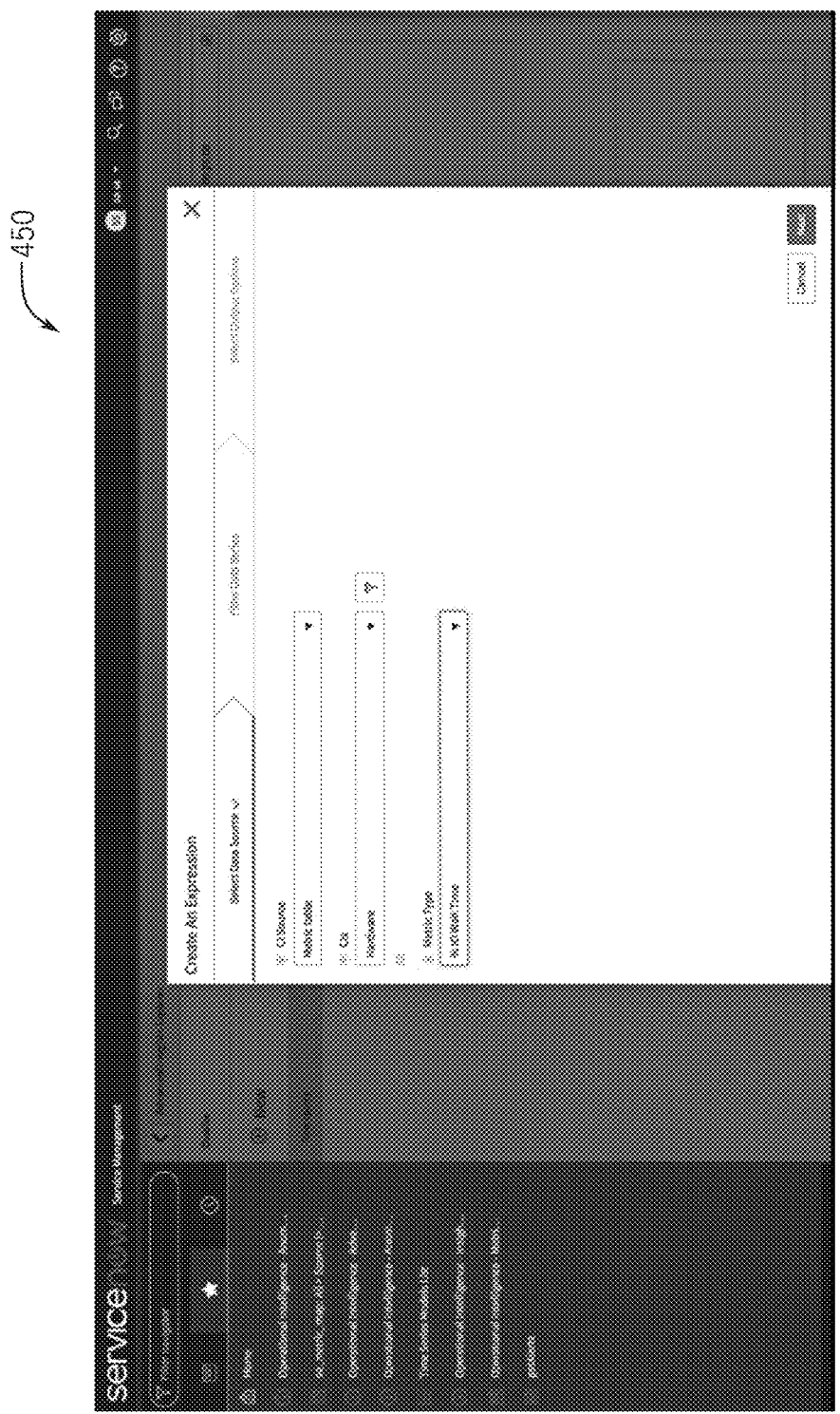
FIG. 20 is a schematic diagram illustrating generation of a new set of expressions, in accordance with aspects of the present disclosure.

FIG. 20 is a schematic diagram illustrating a new guided expression generation experience 450 for generation of a new set of expressions that is rendered after selecting the option 300, in accordance with aspects of the present disclosure. As illustrated, "% IO Wait Time" is selected for the metric type.

Figure 21:
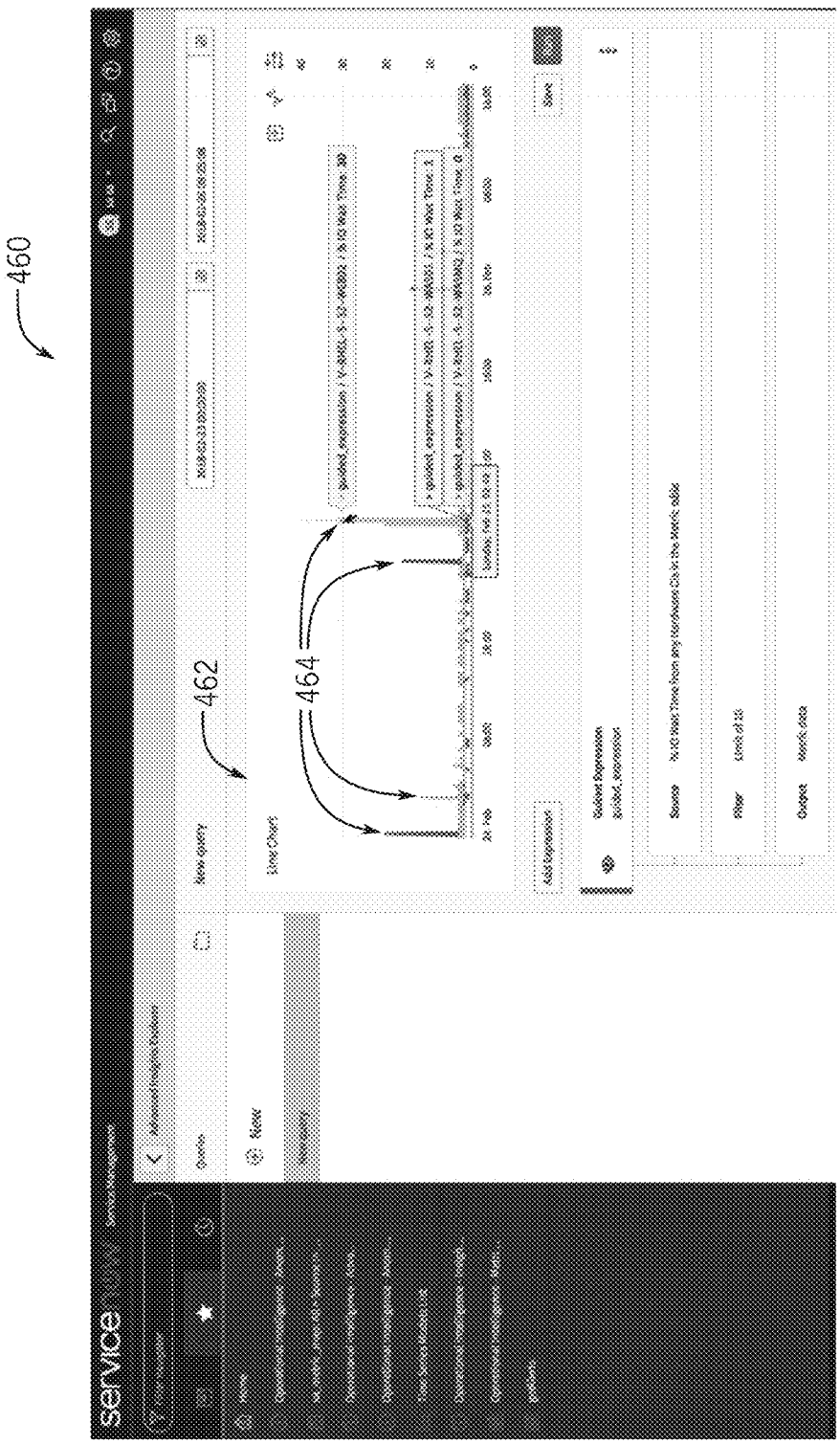
FIG. 21 is a schematic diagram illustrating the results of the expressions generated in FIG. 20, in accordance with aspects of the present disclosure.
Figure 22:
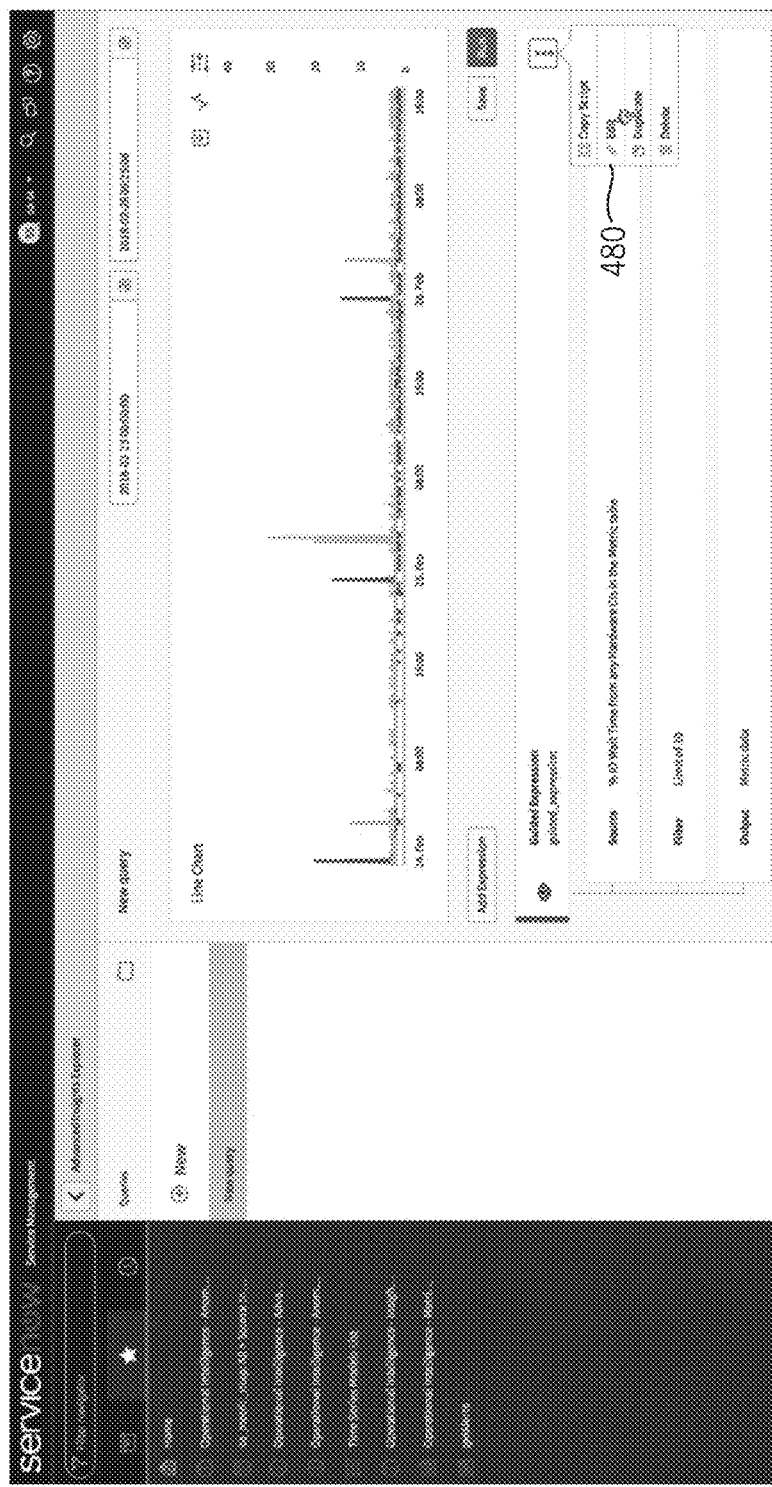
FIGS. 22 and 23 are schematic diagrams illustrating a progression to edit the expressions to isolate certain peaks of metric data, in accordance with aspects of the present disclosure.
Figure 23:
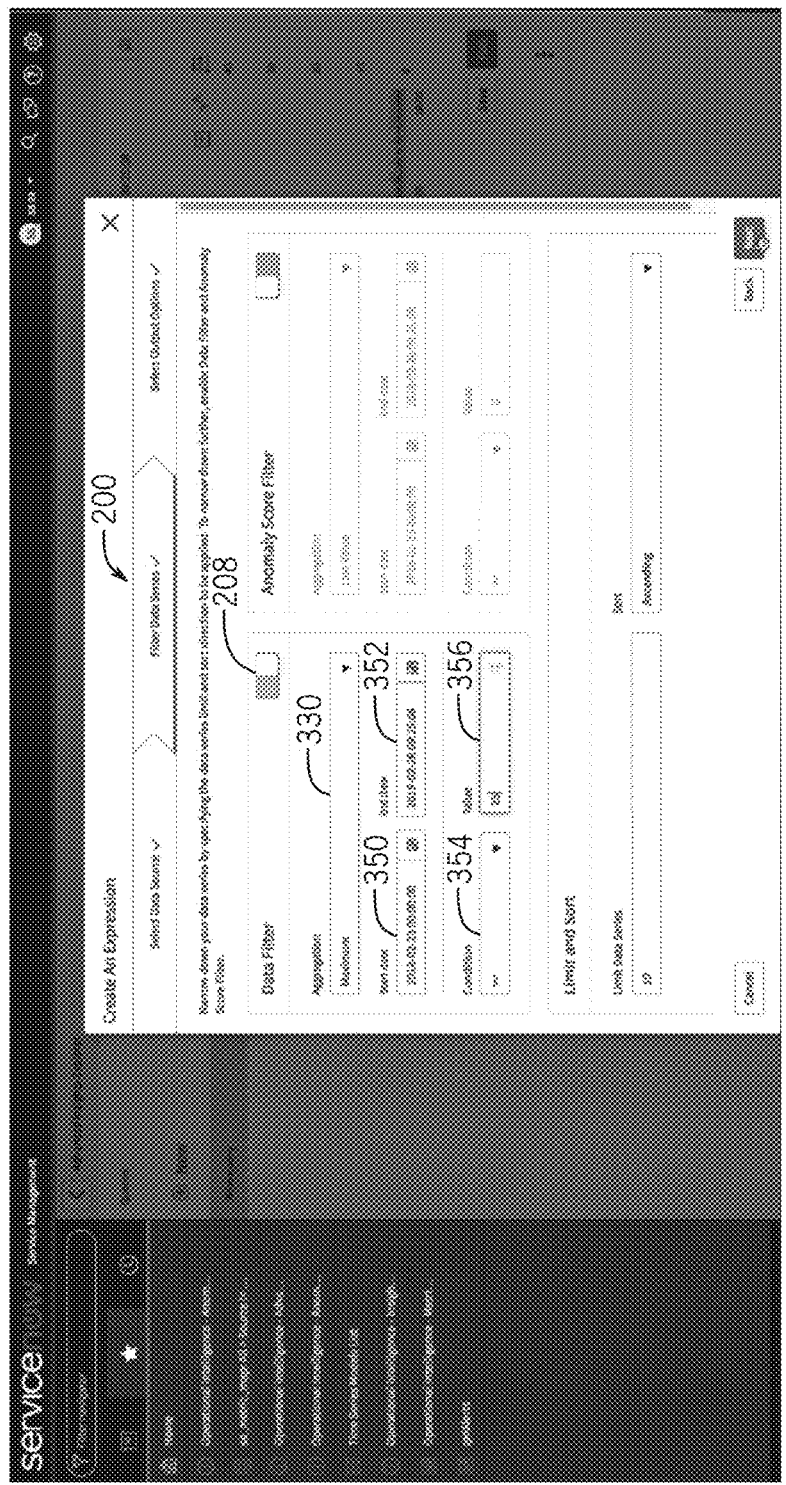

FIG. 21 is a schematic diagram illustrating the results visualization 460 of the expressions generated in FIG. 20, in accordance with aspects of the present disclosure. The line chart 462 includes the percent input/output wait time for the top 10 CIs. As illustrated, there are certain peaks 464 in the data. It may be useful to isolate CIs with such peaks 464 in their data, to isolate potential problematic resources FIGS. 22 and 23 are schematic diagrams illustrating a progression to edit the expressions to isolate certain peaks of metric data, in accordance with aspects of the present disclosure. In FIG. 22 the edit option 480 is selected, resulting in the guided expression generation experience being rendered, pre-populated with the previous selections. In FIG. 23, the user has navigated to data series filter step 200 and has selected the maximum value for the aggregation selection 330. The user has selected 25 as the value 356, to isolate CIs with a % IO wait time maximum value that is >=25. This setting acts to isolate all CIs with the peaks 464 of FIG. 20.

Figure 24:
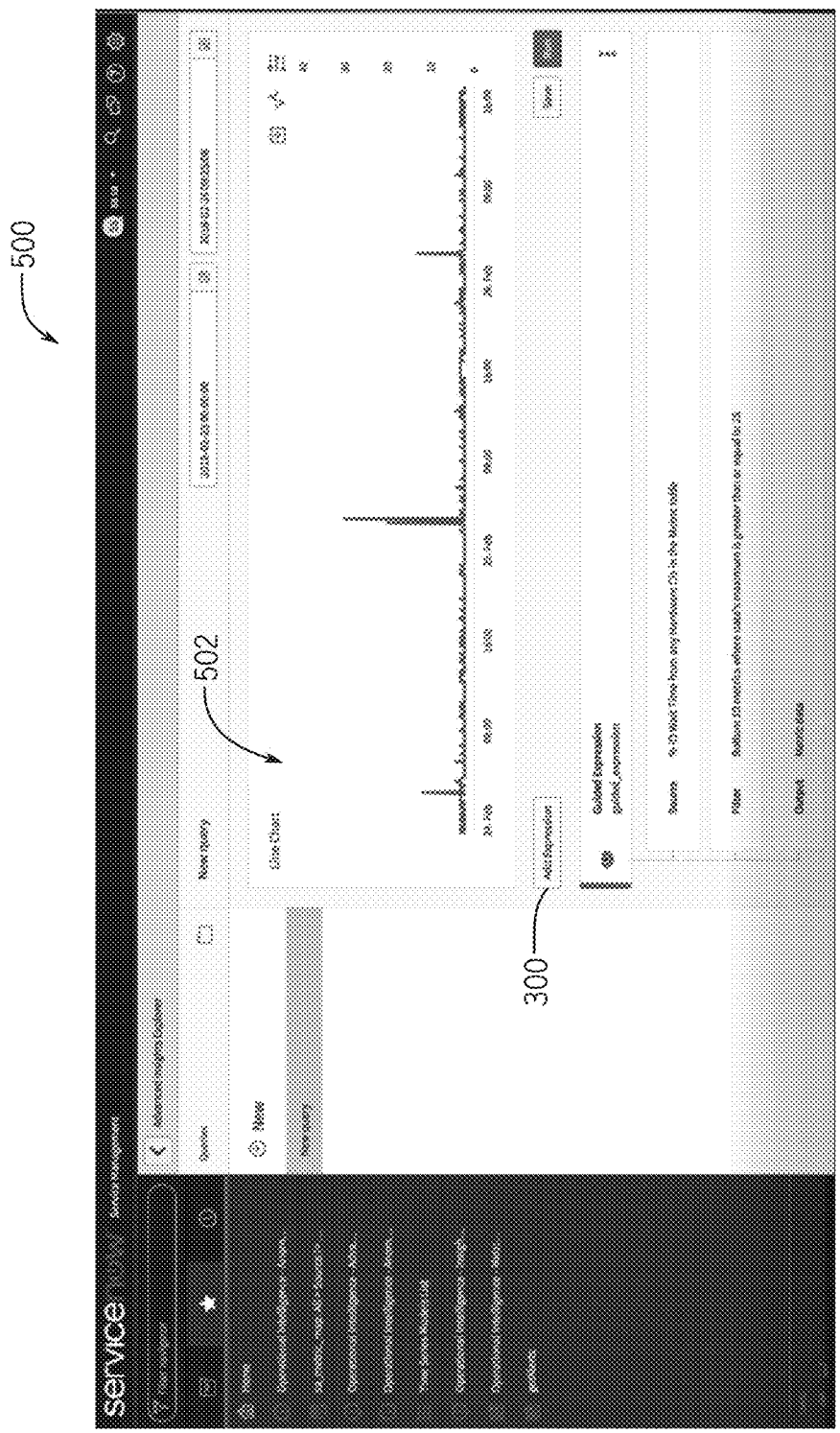
FIG. 24 is a schematic diagram illustrating the results of the isolation of FIGS. 22 and 23, in accordance with aspects of the present disclosure.

FIG. 24 is a schematic diagram illustrating the results 500 of the isolation of FIGS. 22 and 23, in accordance with aspects of the present disclosure. The line chart 502 shows the isolated CIs and their associated metric data. It may be useful to add additional information related to the isolated CIs. As mentioned above, the add expression option 300 may be used to overlay additional information on the line chart 502.

Figure 25:
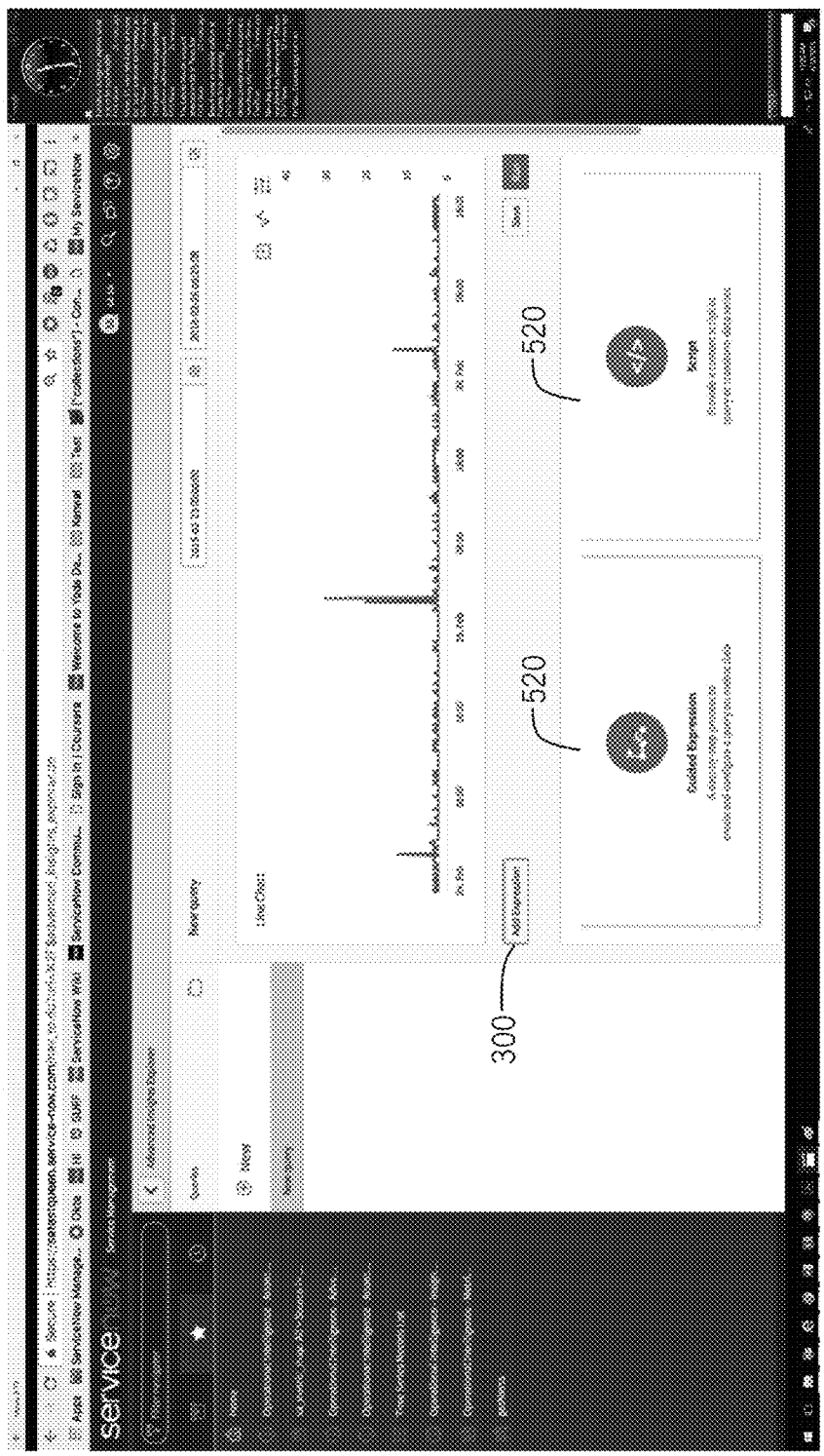
FIGS. 25-27 are schematic diagrams illustrating a progression to add additional expressions to the visualized outputs, in accordance with aspects of the present disclosure.
Figure 26:
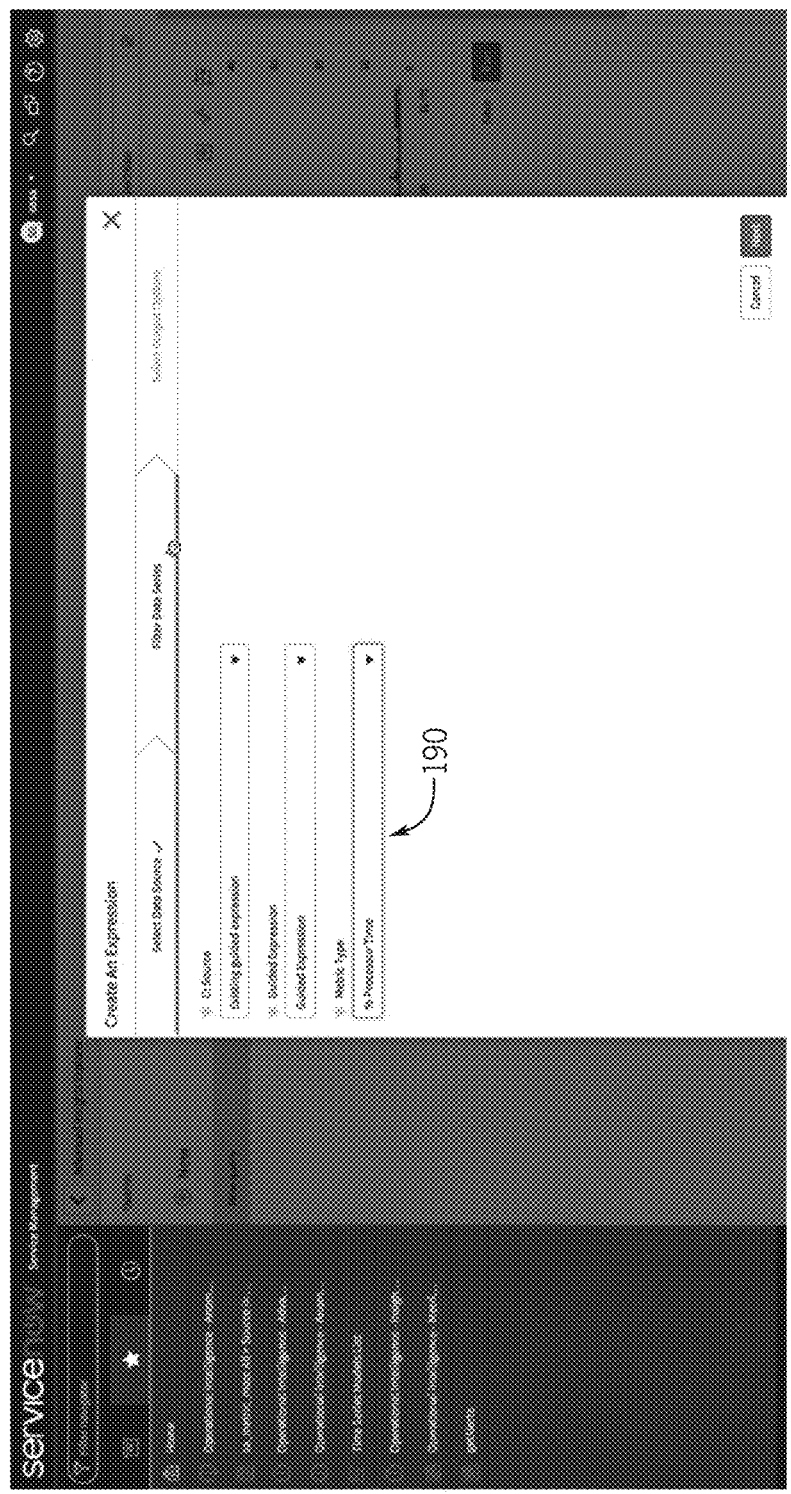
Figure 27:

FIGS. 25-27 are schematic diagrams illustrating a progression to add additional expressions to the visualized outputs, in accordance with aspects of the present disclosure. As illustrated in FIG. 25, upon selecting the option 300, options 520 and 522, selectively allow a guided expression generation experience or a custom script to be added, respectively. After selecting the option 520, the guided expression generation experience is presented, enabling selection of a source, filters, and output options, sequentially. In FIG. 26, the metric type190 is set to "% Processor Time", which may correlate with the % IO Wait Time" that was previously selected. After going through the guided expression generation experience, the results 540 are illustrated (as depicted in FIG. 27). The line chart 542 includes data lines 544 for both the previous data line and the "% Processor Time" associated with the CIs that were in the previous data line. Summaries 546 may be presented for both Guided Expressions. Further, the summary 548 for the second guided expression indicates that the second guided expression is sourced from the first guided expression (arrow 550). Accordingly, new guided expressions can easily build upon previous guided expressions, enabling correlated data to be added in a simple manner, significantly reducing the data query generation complexity of traditional systems.

Figure 28:
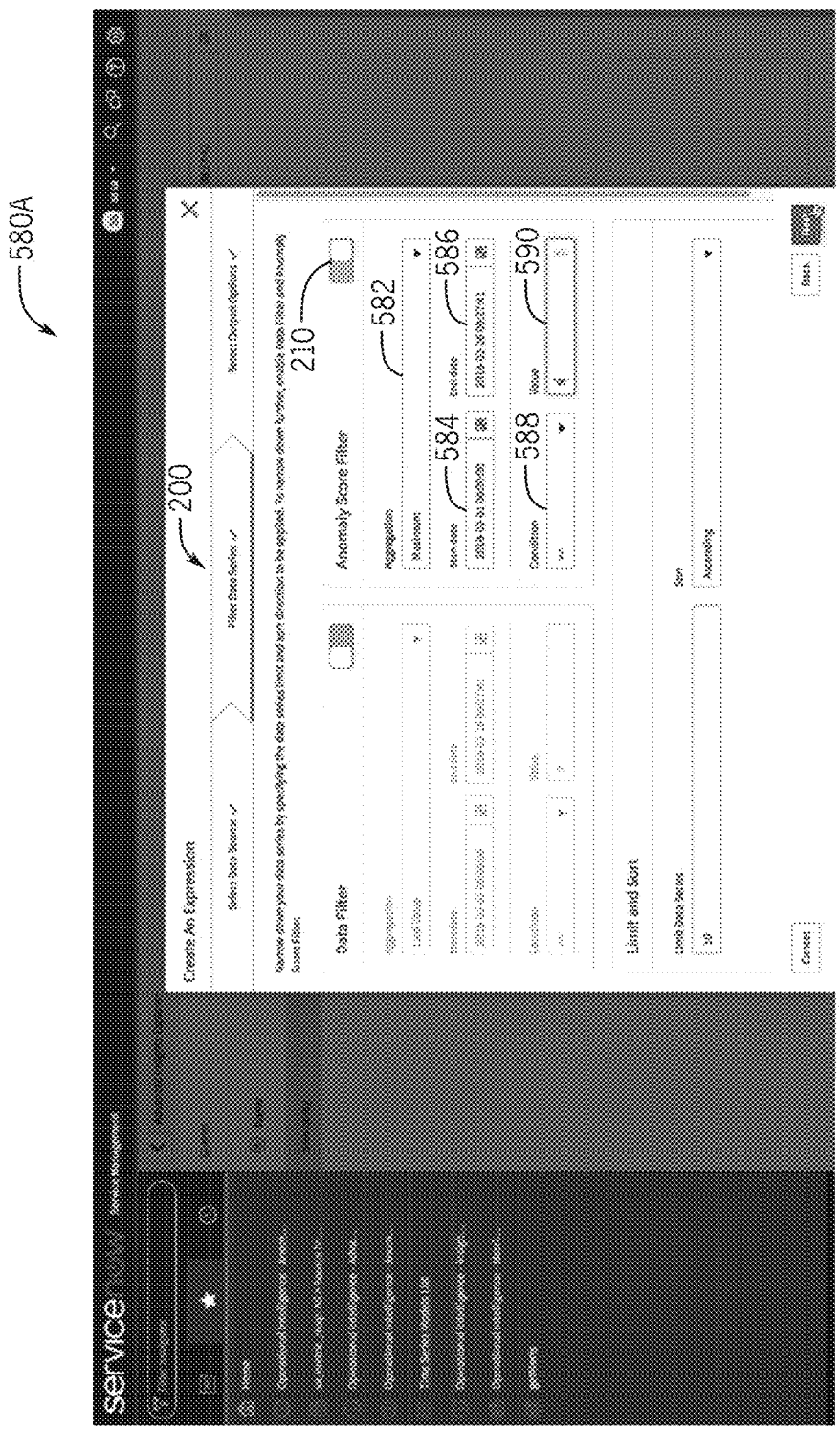
FIGS. 28 and 29 are schematic diagrams illustrating a progression to add an anomaly score filter for the visualized results, in accordance with aspects of the present disclosure.
Figure 29:
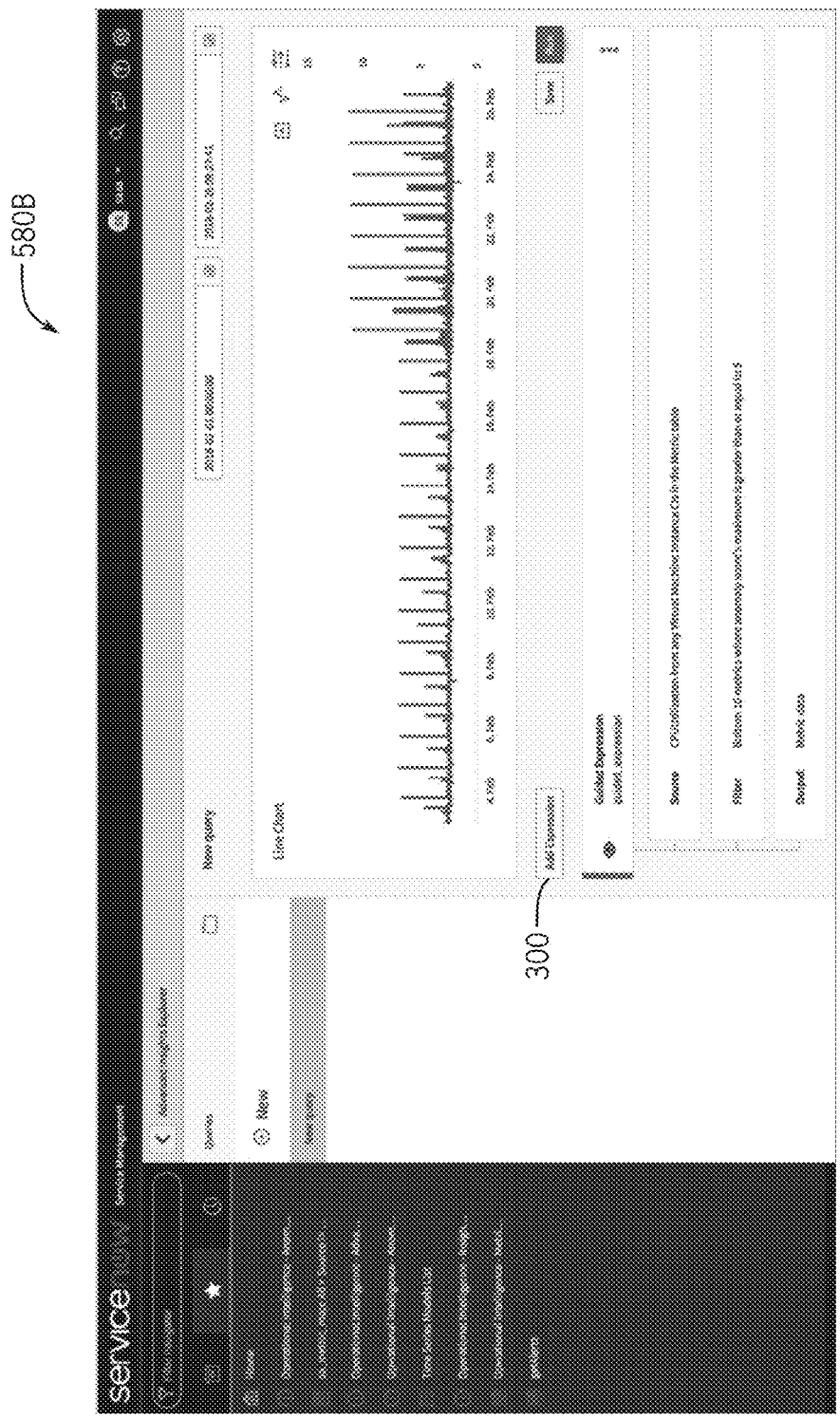

It may also be beneficial to filter data based upon observed anomaly scores. The anomaly scores may signify a magnitude and/or duration of a statistical anomaly in the metric data. FIGS. 28 and 29 are schematic diagrams illustrating a progression 580A and 580B to add an anomaly score filter for the visualized results, in accordance with aspects of the present disclosure. In FIG. 28, the user has navigated to the data series filter step 200. The user has activated the anomaly score filter toggle 210, which results in activation of an anomaly score aggregation selector 582, a range start selector 584, a range end selector 586, a condition selector 588, and a value field 590 corresponding to the condition selector 588. By setting these selectors, additional data filters may be applied to isolate CI data. In FIG. 29, the results illustrate CPU utilization for virtual machine instance CIs, filtered by anomaly scores greater than or equal to 5.

Figure 30:
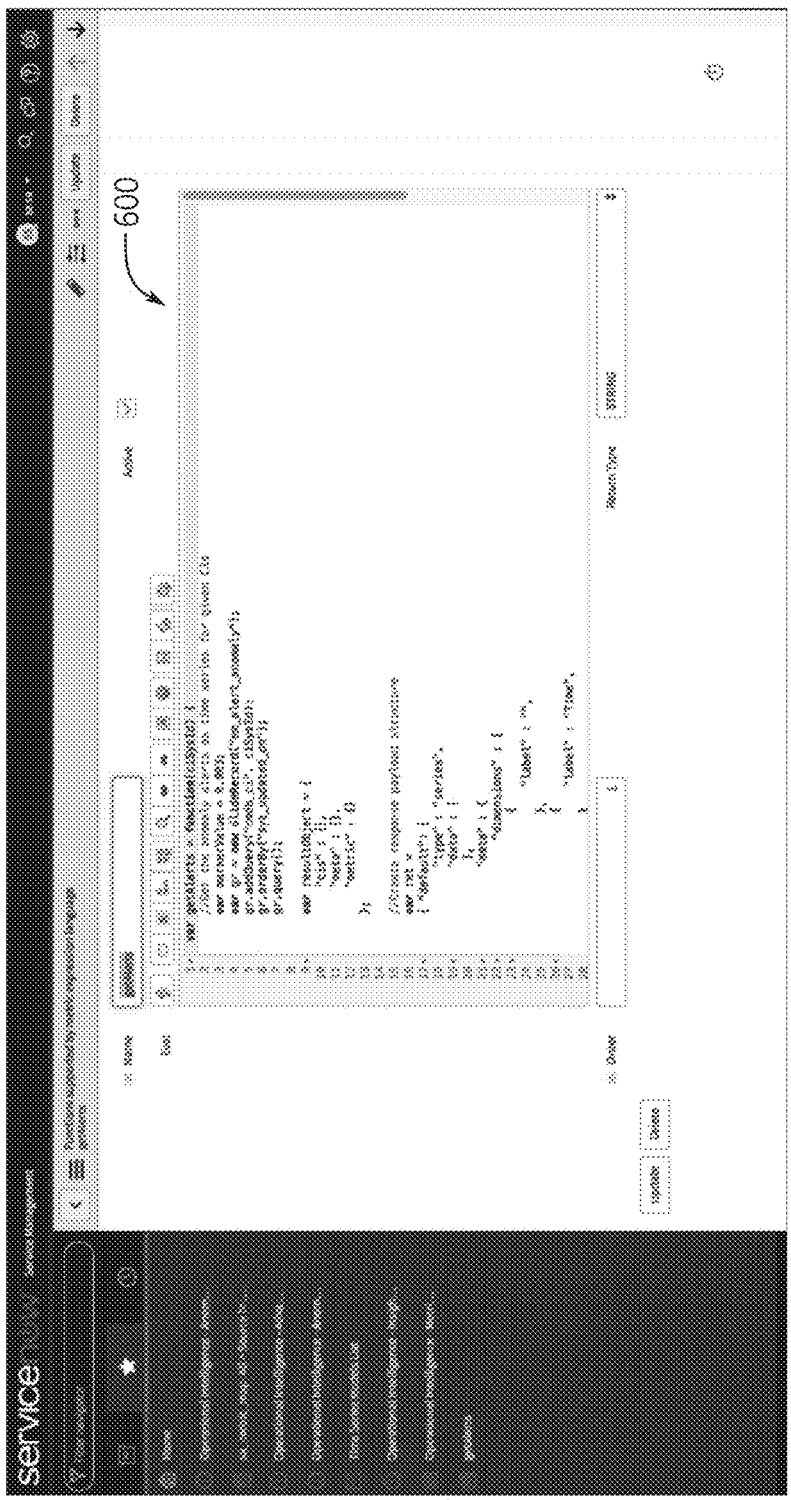
FIGS. 30 and 31 are schematic diagrams illustrating a progression of custom function editing, in accordance with aspects of the present disclosure.
Figure 31:
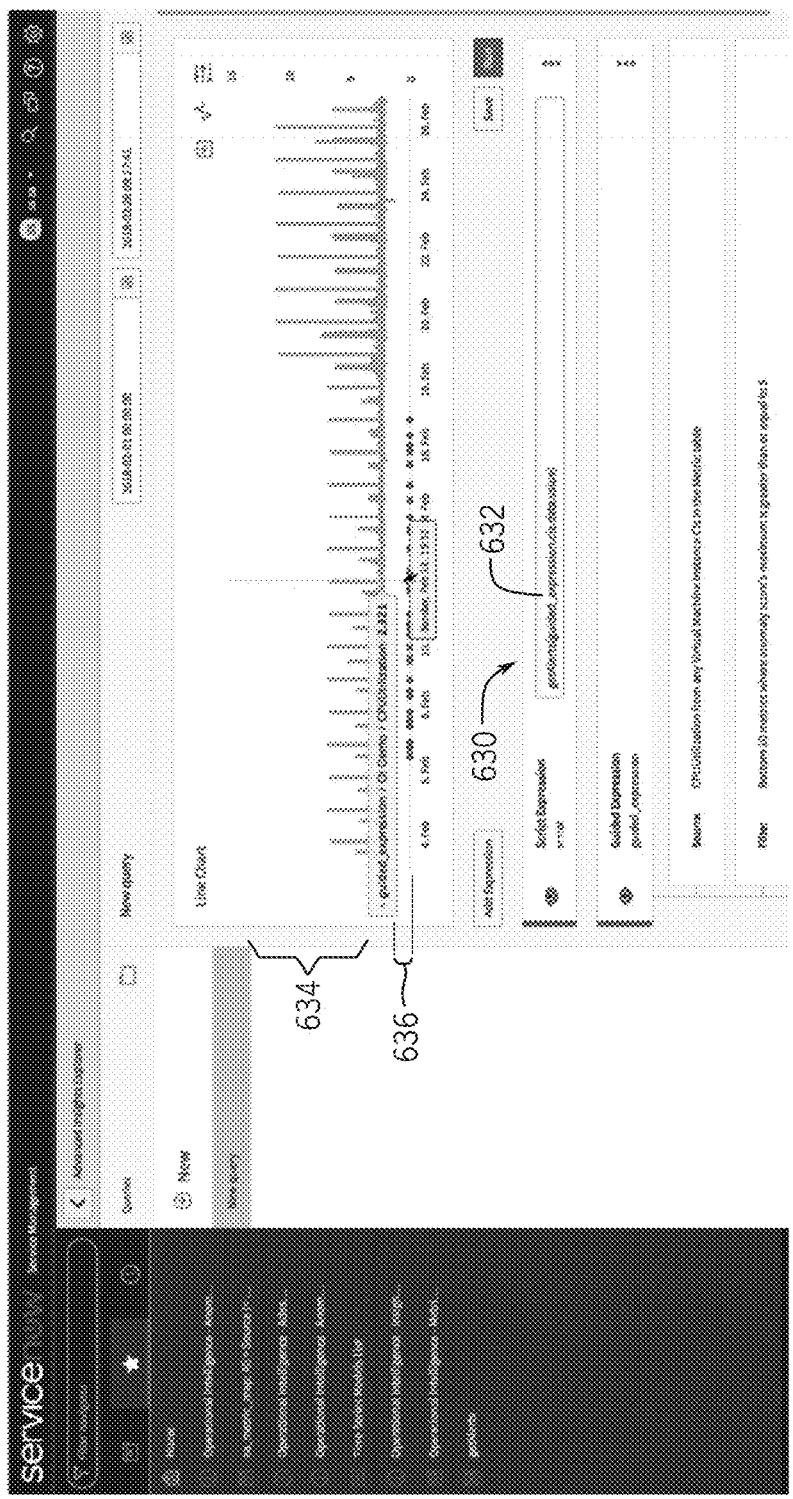

As mentioned above, custom functionality may be added as well using custom scripts. To add additional customized visualizations of data to the visualization in progression 580B, the user can select option 300 and then option 522 from the resultant menu. FIGS. 30 and 31 are schematic diagrams illustrating a progression of custom function editing, in accordance with aspects of the present disclosure. In FIG. 30, after selecting option 522, the script editor 600 is displayed. The script editor 600 allows a user to create new scripts for particular metric data. In the embodiment of FIG. 30, the custom code creates a plot for data passed to the script.

In FIG. 31, the script from the script editor is executed, by calling the script with a CI value parameter in field 630. More specifically, the named function getAlerts is called with a parameter 632 that identifies the CIs presented in the data line 634. This script, when run, generates plots 636 at points in time where alerts were triggered.

As may be appreciated, the techniques described herein provide an easy yet powerful mechanism for accessing and drilling into metric data. The guided expression generation experience provide a step by step process for analyzing complex metric data using guided sequential steps. Further, expressions can be easily built upon to add additional data or otherwise drill down into the data.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

We claim:
1. An enterprise platform, comprising:
a time series database, comprising time series data related to configuration items associated with an enterprise;
one or more instance data tables comprising instance data associated with the enterprise;
a function library stored in a storage medium, wherein the function library comprises:
a set of functions configured to evaluate the time series data, the instance data, or both;
function metadata indicating valid attributes for each function of the set of functions; and
a set of scripts associated with implementing each function of the set of functions;
a scripting engine configured to retrieve the set of scripts from the storage medium and execute the set of scripts to acquire resultant data from the time series data, the instance data, or both;

a visualization component comprising a guided expression experience graphical user interface (GUI) to generate one or more expressions configured to cause the guided expression experience GUI to present metric data based on the resultant data received from the scripting engine, wherein the guided experience GUI is configured to provide: a series of prompts for one or more user interactions to specify metric criteria for generating the one or more expressions, the metric criteria comprising: data source criteria indicative of one or more configuration items of the enterprise, filtering criteria indicative of one or more classes of configuration items, and output criteria for presenting the metric data, wherein the visualization component comprises an affordance for selecting a previously generated guided expression that was previously generated via the visualization component; and an advanced insight endpoint executable by a processor, the processor communicatively coupled to and accessible by the storage medium, wherein the processor is configured to:
receive the one or more expressions from an expression component of an advanced insights explorer user interface, wherein the one or more expressions are sourced from the one or more user interactions with the guided expression experience GUI and wherein the one or more expressions comprise the data source criteria, the filtering criteria, and the output criteria;
parse the one or more expressions to:
identify a function from the set of functions based on the metric data, wherein the function is configured to evaluate the time series data based on the metric criteria associated with the one or more expressions;
identify respective function metadata of the function;
identify one or more attributes of the one or more expressions configured to evaluate the time series data based on the metric criteria;
retrieve the function and the respective function metadata from the storage medium;
compare the one or more attributes to one or more valid attributes of the function defined by the respective function metadata
to validate whether the one or more attributes are valid;
when the one or more attributes are valid:
retrieve a respective set of scripts associated with implementing the function from the storage medium;
merge the one or more attributes with the respective set of scripts to generate one or more scripts corresponding to the one or more expressions for execution by the scripting engine;
receive, from the scripting engine, results of executing the one or more scripts; and
provide the results to a visualization component of the advanced insights explorer user interface, to cause rendering of the results within the advanced insights explorer user interface in accordance with the output criteria; and
otherwise, when the one or more attributes are not valid, provide a resultant error visualization to the visualization component.

2. The enterprise platform of claim 1, wherein the advanced insight endpoint comprises a representational state transfer (REST) endpoint.

3. The enterprise platform of claim 1, wherein the one or more expressions comprise the data source criteria that defines particular metric data input of interest.

4. The enterprise platform of claim 3, wherein the data source criteria comprises a configuration item source selection, defining a location from the time series database, the one or more instance data tables, or both.

5. The enterprise platform of claim 3, wherein the data source criteria comprises a configuration item class selection.

6. The enterprise platform of claim 3, wherein the data source criteria comprises a metric type.

7. The enterprise platform of claim 1, wherein the one or more expressions comprise data that defines data series filtering criteria.

8. The enterprise platform of claim 7, wherein the data series filtering criteria comprises a data filter aggregation condition, an anomaly score aggregation condition, a data series quantity limit, a sort order definition, or any combination thereof.

9. The enterprise platform of claim 1, wherein the one or more expressions comprise data that defines results output criteria.

10. The enterprise platform of claim 9, wherein the results output criteria comprise:
a transform option for grouping, transforming, or both resultant metric data; and
a selected output type comprising metric, bounds, anomaly scores, or a combination thereof.

11. A tangible, non-transitory, machine-readable medium, comprising machine-readable instructions that, when executed by one or more processors, cause the one or more processors to:
render an advanced insight graphical user interface, the advanced insight graphical user interface comprising a guided expression experience to identify metric criteria for evaluating time-series data, the metric criteria comprising data source criteria, data series filter criteria, and output options criteria, wherein the guided expression experience configured to sequentially guide selection of:
first, the data source criteria to be used in a query;
second, the data series filter criteria to be used in the query; and
third, the output options criteria for formatting visualization of results of the query;
wherein the advanced insight graphical user interface comprises an affordance for selecting a previously generated guided expression that was generated via the advanced insight graphical user interface as the data source criteria, enabling guided expressions to be built upon one another;
generate, based upon interaction with the guided expression experience, a set of expressions, the set of expressions comprising the data source criteria, the data series filter criteria, and the output options criteria;
provide the set of expressions to an enterprise platform endpoint for evaluation, the evaluation comprising:
parsing the set of expressions to:
identify a function from functions of a function library based on the metric data, wherein the function is configured to evaluate the time-series data based on the metric criteria associated with the set of expressions;
identify function metadata from the function library based on the function;

identify one or more attributes of the set expressions configured to evaluate the time-series data based on the metric criteria;

comparing the one or more attributes to one or more valid attributes of the function defined by the function metadata to validate whether the one or more attributes are valid;

when the one or more attributes are valid;
retrieve a set of scripts from the function library, wherein the set of scripts is associated with implementing the function;

merge the one or more attributes with the set of scripts to generate one or more scripts corresponding to the one or more expressions;

receive, from the enterprise platform endpoint, a set of results data based upon the one or more scripts; and present the set of results via the advanced insight graphical user interface, in accordance with a visualization configuration of the advanced insight graphical user interface; and otherwise, when the one or more attributes are not valid, provide a resultant error visualization via the advanced insight graphical user interface.

12. The machine-readable medium of claim 11, comprising machine-readable instructions that, when executed by the one or more processors, cause the one or more processors to:

provide a first set of prompts for selection of the data source, the first set of prompts comprising: a configuration item source selector for selecting a table to retrieve metric data from, a configuration item class selector for selecting a particular class of configuration item to retrieve metric data for, and a metric type selector for selecting a particular metric to retrieve metric data for.

13. The machine-readable medium of claim 12, comprising machine-readable instructions that, when executed by the one or more processors, cause the one or more processors to:

provide a second set of prompts, sequentially after providing the first set of prompts, for selection of the data series filter, the second set of prompts comprising:

a data aggregation filter that, when selectively active, filters metric data provided in the set of results based upon a condition to be met by aggregated metric data; and an anomaly score filter that, when selectively active, filters metric data provided in the set of results based upon an anomaly score condition to be met by aggregated anomaly scores of the metric data.

14. The machine-readable medium of claim 13, comprising machine-readable instructions that, when executed by the one or more processors, cause the one or more processors to:

provide a third set of prompts, sequentially after providing the second set of prompts, for selection of the output options, the third set of prompts comprising:

transform options that, when selectively enabled, transform the set of results into an average, a minimum, a maximum, a sum, a count, a median, or a standard deviation over time; and output type options that, when selectively enabled, display metric data, bound data, anomaly score data, or any combination thereof. that, when selectively active, filters metric data provided in the set of results based upon a condition to be met by aggregated metric data.

15. The machine-readable medium of claim 11, comprising machine-readable instructions that, when executed by the one or more processors, cause the one or more processors to:

present an option that enables additional expressions to be generated by using the set of results; and upon selection of the option, provide a second guided expression experience, wherein at least one of a second set of expressions for the second guided expression is based upon the set of results.

16. A computer-implemented method, comprising:

receiving one or more expressions from an expression component of an advanced insights explorer user interface, wherein the one or more expressions are sourced from one or more user interactions with a guided expression user experience of the advanced insights explorer user interface, wherein the guided expression user experience comprises an affordance for selecting a previously generated guided expression that was generated via the guided expression user experience as a data source of a current guided expression to be generated based upon the one or more expressions, enabling guided expressions to be built upon one another;

parsing the one or more expressions to:
identify a function from a set of functions stored in a function library, wherein the function is configured to evaluate time-series data based on the one or more expressions and one or more attributes of the one or more expressions;

compare the one or more attributes to one or more valid attributes of the function defined by function metadata stored in the function library to validate whether the one or more attributes are valid, wherein the function metadata defines the one or more valid attributes for the function;

when the one or more attributes are valid:
retrieving a set of scripts from the function library, wherein the set of scripts is associated with implementing the function;

merging the one or more attributes with the set of scripts to generate one or more scripts corresponding to the one or more expressions for execution by a scripting engine;

receiving, from the scripting engine, results of executing the one or more scripts; and providing the results to a visualization component of the advanced insights user interface, to cause rending of the results within the advanced insights explorer user interface; and otherwise, when the one or more attributes are not valid, providing a resultant error visualization to the visualization component.

17. The computer-implemented method of claim 16, wherein the guided expression user experience comprises sequentially guiding selection of:

first, a data source criteria to be used in a query;
second, a data series filter to be used in the query; and
third, output options for visualization of results of the query.

18. The computer-implemented method of claim 17, wherein the data source criteria comprises:

data source criteria that defines a source for metric data;
data that defines data series filtering criteria; and
data that defines results output criteria.

19. The computer-implemented method of claim 16,
receiving a second one or more expressions from the expression component of the advanced insights explorer user interface, wherein the second one or more expressions are sourced from a second one or more user interactions with the guided expression user experience of the advanced insights explorer user interface;
parsing the second one or more expressions and validating the second one or more expressions against the set of functions stored in the function library;
generating and providing for execution, by the scripting engine, a second one or more scripts corresponding to the second one or more expressions;
receiving, from the scripting engine, a second set of results of executing the second one or more scripts; and
providing the second set of results to the visualization component of the advanced insight user interface, to cause rendering of the second set of results overlaid on the results within the advanced insights explorer user interface.

20. The computer-implemented method of claim 16,
receiving a second one or more expressions from the expression component of the advanced insights explorer user interface, wherein at least a portion of the second one or more expressions are sourced from the results of executing the one or more scripts and at least a second portion of the second one or more expressions are sourced from a second one or more user interactions with the guided expression user experience of the advanced insights explorer user interface;
parsing the second one or more expressions and validating the second one or more expressions against the set of functions and a set of function metadata stored in the function library;
generating and providing for execution, by the scripting engine, a second one or more scripts corresponding to the second one or more expressions;
receiving, from the scripting engine, a second set of results of executing the second one or more scripts; and
providing the second set of results to the visualization component of the advanced insight user interface, to cause rending of the second set of results within the advanced insights explorer user interface.

* * * * *